United States Patent [19]
Shpigel

[11] Patent Number: 5,848,852
[45] Date of Patent: Dec. 15, 1998

[54] STRUCTURAL CONNECTION SYSTEM AND METHOD, AND STRUCTURES CONSTRUCTED THEREWITH

[76] Inventor: Vladimir Shpigel, 7522 Spring Lake Dr., apartment A, Bethesda, Md. 20817

[21] Appl. No.: 649,986

[22] Filed: May 17, 1996

[51] Int. Cl.[6] ............ A47B 13/04; A47C 17/86; F16B 12/12; F16B 12/46
[52] U.S. Cl. .......... 403/219; 403/217; 403/170; 403/169
[58] Field of Search .................. 403/219, 217, 403/218, 176, 172, 171, 170, 169; 52/646, 648.1

[56] References Cited

U.S. PATENT DOCUMENTS

| | | | |
|---|---|---|---|
| 1,763,748 | 6/1930 | Best | 403/219 |
| 1,975,384 | 10/1934 | Ahlborn | 403/217 X |
| 2,611,422 | 9/1952 | Roney | 403/217 |
| 2,639,956 | 5/1953 | Jacobson | 403/219 |
| 3,270,478 | 9/1966 | Attwood | 403/218 X |
| 3,563,581 | 2/1971 | Sommerstein | 403/217 |
| 5,364,312 | 11/1994 | Cunaed et al. | 403/217 X |

FOREIGN PATENT DOCUMENTS

| | | | |
|---|---|---|---|
| 2343152 | 9/1977 | France | 403/219 |
| 619609 | 8/1976 | Russian Federation | 403/217 |

*Primary Examiner*—Anthony Knight
*Attorney, Agent, or Firm*—Ashen & Lippman

[57] ABSTRACT

A crossmember defines guide surfaces to receive a leg tip. Preferably a screw, cam or lever applies nonimpulse force to wedge the tip against the surfaces. The tip is preferably unthreaded, exclusively noncircular in at least external cross-section, and very generally aligned with the leg axis. Preferably the screw or the like pulls the tip length-wise into the crossmember without rotating or threading the tip into the surfaces, and also retains the tip wedged in place. Also preferably a notch or analogous traction feature is formed in the leg or crossmember, and the screw (distinct from the tip) threaded to the other. The screw engages the notch to force the tip into the crossmember. Further preferably the crossmember includes at least two interfitted cross-pieces cooperating to define the guide surfaces; the leg has a segment with transverse dimension of at least 2 or 3 cm and long dimension many times that, and the crossmember is in essence stationary and generally horizontally extended, for supporting at least a person or comparable weight.

54 Claims, 21 Drawing Sheets

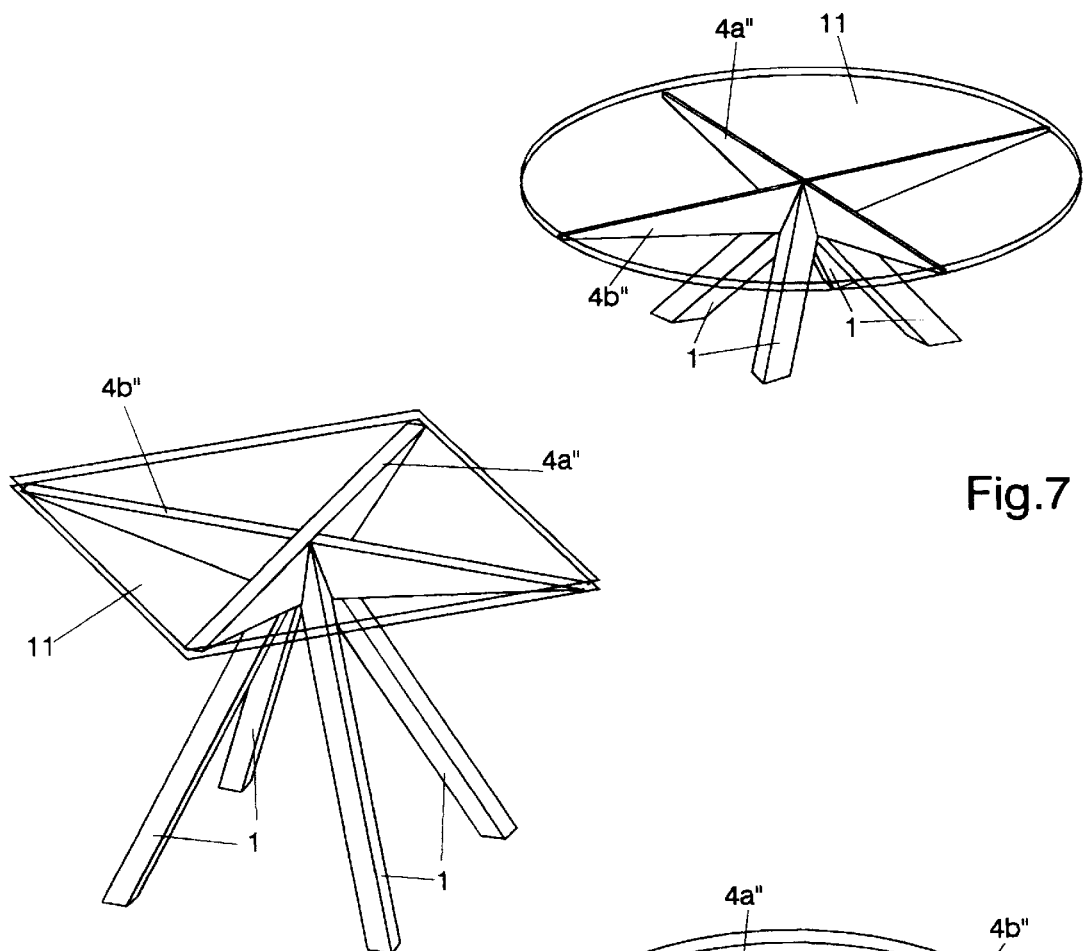
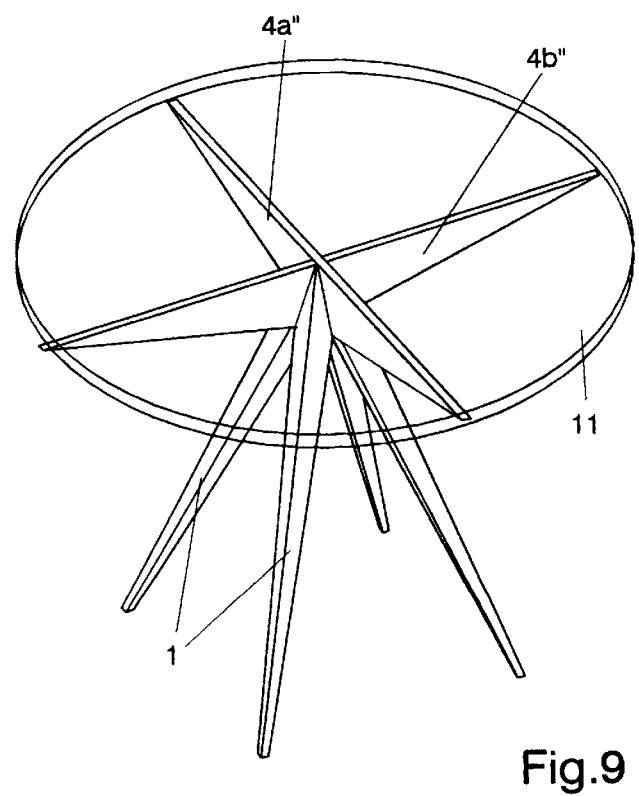
Fig.7
Fig.8
Fig.9

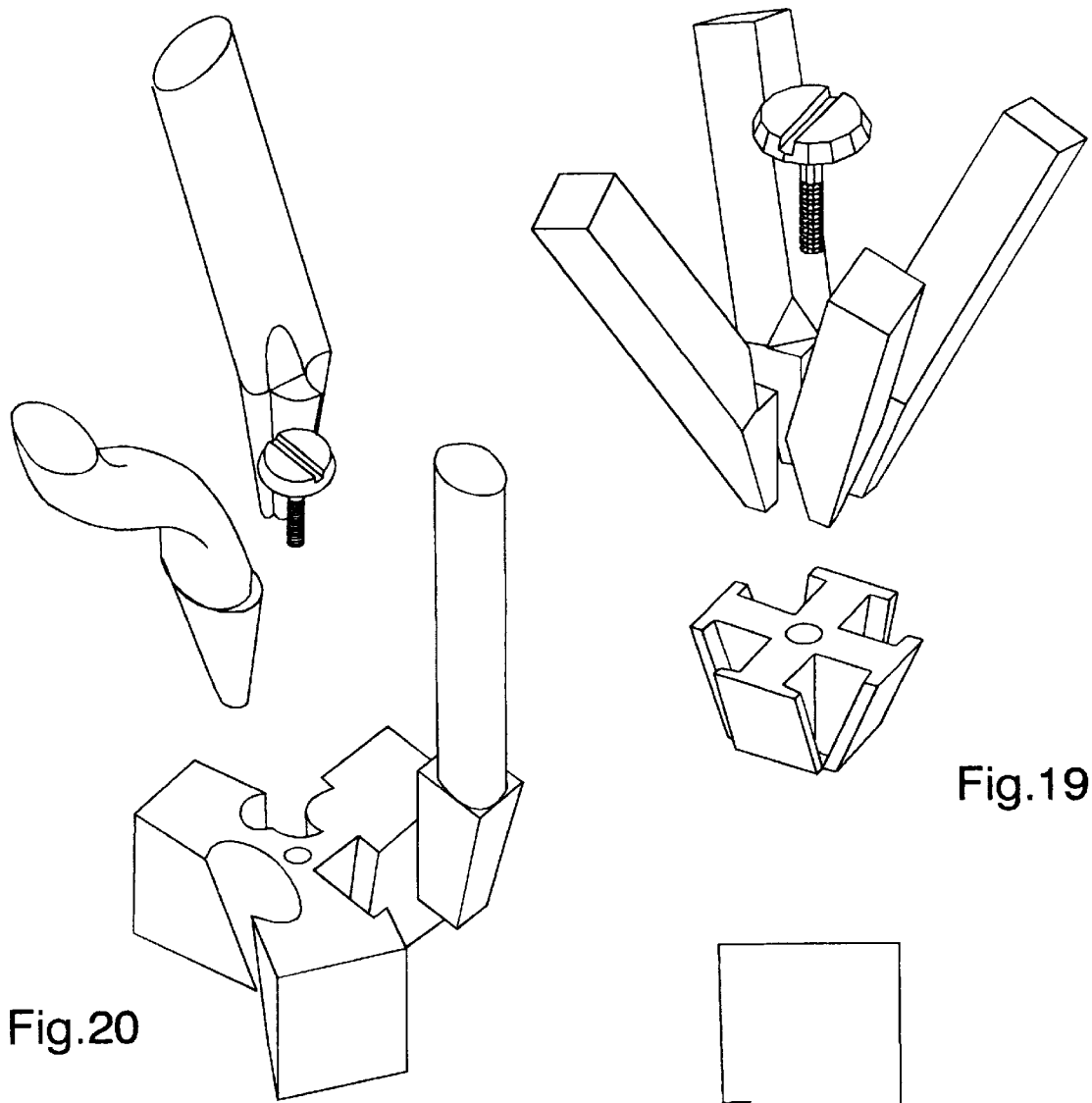
Fig.19
Fig.20
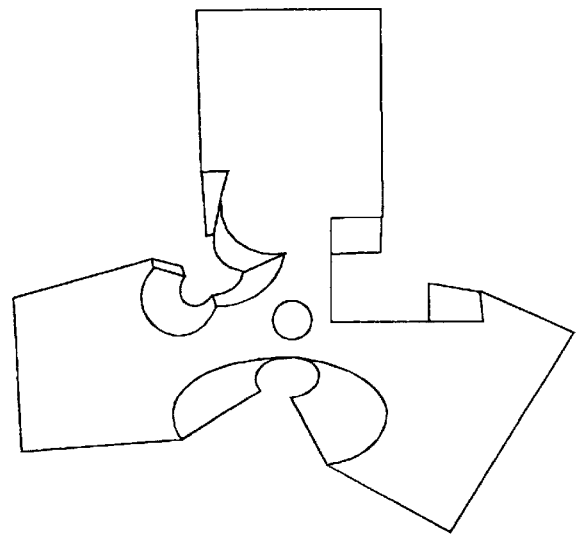
Fig.20a

STRUCTURAL CONNECTION SYSTEM AND METHOD, AND STRUCTURES CONSTRUCTED THEREWITH

BACKGROUND

1. Field of the Invention

This invention relates generally to structural systems; and more particularly to connections or joints for connecting structural elements together to provide constructions such as furniture, buildings, play equipment, temporary structures, crane or boom frames, and stationary framework generally.

2. Related Art

Myriad systems have been introduced for firmly interconnecting two or more structural components. In furniture, for example, it has long been known to taper the tip of a leg and form a matching tapered hole in the underside of a chair or the like—and firmly drive the tip into the hole to wedge the pieces together.

Such a classical construction requires some skill, or some special equipment—or both—for impacting (with a mallet, for example) or pressing the leg into place. It also requires a separate provision of retaining means such as glue or a crosspeg, to reinforce the wedging action of the matching tapers.

Furthermore as the surfaces wear under repeated stress the mating of the surfaces typically becomes less firm and the furniture more shaky. There is no convenient way, in a typical home or office, to effectively restore their new condition of stability.

One ancient variant involves formation of coarse wooden threads in the tapered tip and hole, enabling the pieces to be screwed together with minimal skill. Pieces prepared this way can be shipped unassembled, and put together easily by a retailer or consumer—and if they become loose, in some cases a consumer can retighten them by firmly screwing the leg further in.

Formation of the threads, however, represents additional relatively expensive processing at the factory. The necessity of rotating the leg relative to the horizontal member also interferes with provision of crossbraces and like reinforcements lower along the leg, so that the structure is susceptible to rapid deterioration under vigorous use.

More modernly a particularly popular construction includes a custom-formed bracket secured to the underside of a table or chair, and a stud embedded sideways in the leg. The bracket is preferably metal, though sturdy wooden angle pieces are successfully used—especially beneath tables, where ample concealed room is available.

The pieces are shipped unassembled, and for assembly the stud is passed through a hole in the bracket—by motion transverse to the axis of the leg—and easily secured to the bracket with a nut. These constructions if well designed can be very sturdy and stable, and have the advantage of amenability to repeated disassembly and reassembly.

They do, however, require the additional heavy bracket and detailed installation of several fasteners—screws or the like—to hold the bracket very firmly to the horizontal member. In addition, generally speaking this type of construction, unless made very sturdily and with extremely careful design attention to results of hard use, tends to loosen and become unsteady or "rickety" with age.

In these more-recent constructions not much use of jamming or wedging configurations is found. One structural coupling shown by Fairbank in U.S. Pat. No. 1,919,780 seems to suggest a wedging action, but the geometry is said to be merely for purposes of gravity retention. Similarly Lever in U.S. Pat. No. 4,684,282 introduces a three-way mortise and tenon which turns out to be only neatly interfitted, not wedged together. Other interfitting joints are shown by U.S. Pat. Nos. 4,383,780 of Davison and 4,540,308 of Colby.

Now turning to larger constructions such as scaffolding and other temporary frame structures: Gostling in U.S. Pat. No. 3,880,533 discloses a locking assembly in which a wedge-shaped hook is secured to the end of a longitudinally (e. g., horizontally) extending structural member. A channel is welded to a transversely (e. g., vertically) extending structural member.

The hook is oriented transversely to the longitudinal member—which is to say, parallel to the transversely extending member. In use, the hook is dropped into place within the channel, or otherwise inserted into the channel, and then is driven home by impact from a separate source (e. g. a hammer).

As will be apparent such a system is suited only for the roughest of applications. In assembly it is noisy and can vibrate nearby homes or offices; and in disassembly it requires similar rough handling.

Accordingly it is far from optimal for use in buildings where officework or residential use continues during assembly and disassembly of scaffolding—as for, instance, relative to incidental painting or maintenance work in an office building or residence. It is particularly unsuited for adaptation to furniture that is to be assembled by the customer.

A more civilized approach to open frameworks and like assemblages appears in U.S. Pat. No. 3,563,581 of Sommerstein. A generally cubical boxlike element serves as a hub or node for interconnection of the ends of two or more hollow structural bars—whose flattened, right-angle-bent or 45°-angle-bent ends protrude through slots into the box.

Within the box, a screw draws up two clamping components together in a wedging relationship, so that the clamp seizes the flattened, bent ends of the structural bars. In this device the wedging action is at a small scale, all internal to the boxlike clamp, and only the ends are stabilized together; in other words, there is no bodily wedging motion of the bars themselves. To this extent the joint appears to be potentially weak.

Thus Gostling and Sommerstein offer systems that have contrasting characteristics: one rather for roustabouts with sledges, but very sturdy; the other amenable to gentlemen with end-wrenches, but limited in large-structure stability. In addition, Sommerstein's patent suggests no adaptation for connection of legs, as for instance furniture legs, to a horizontally extending platform such as the supporting surface of a chair or table.

Other patents of general interest, but somewhat more remote than those discussed above, include U.S. Pat. No. 5,304,011 of Seeders for a wedge-locked joint that is usable in assembling buildings (the wedges are to be "uniformly set with a tuning hammer"). Joints lacking wedging action are taught in U.S. Pat. Nos. 4,619,546 of Schlippes for "jutted" joints; 2,097,172 of Yurkovitch for an interlocking joint construction; 3,563,580 of Black, and 4,385,801 of Kamel.

In vehicle-component fastening arts (considered nonanalogous arts in relation to the present invention) are U.S. Pat. Nos. 5,175,903 of Curtis and 5,213,006 of Liao. Curtis shows a representative construction for securing a windshield-wiper arm to its spindle: the wiper arm has a tapered hole, and the spindle is correspondingly tapered and its tip externally threaded for a retaining nut. Forming external threads in a relatively large-cross-section article has various drawbacks of cost and convenience as mentioned earlier in regard to coarse-threaded chair legs.

In addition, neither the spindle nor the arm is truly a structural member in the sense applicable to load-bearing furniture, buildings, space frames etc. Also the spindle is relatively very short in comparison with furniture legs or with framework struts and bars.

The Liao reference shows a representative system for securing a bicycle handlebar gooseneck into the vertical bearing on the frame. Cinching up a bolt in the top of the stem jams both the stem and a bevel-cut round nut outward against the side of the bearing case—but here the stem must be properly positioned independently by an installer, rather than being drawn into position by the screw.

Ristow in U.S. Pat. No. 2,662,778 shows plural pipe legs converging into a common socket, in a "shoe" for a non-wheeled support of a two-wheel hand truck—deemed nonanalogous art with respect to the present invention. The legs are held wedged into the shoe by a block which is pulled down toward the shoe (and jammed against the legs) by a central bolt, threaded into the block.

Each leg is further retained under the block by a "toe . . . struck out from the bottom edge of each pipe leg, . . . or some other equivalent projection . . . to insure a more positive locking engagement . . . ." Ristow never suggests use of this wedging arrangement to connect together anything other than the two legs themselves and their "shoe" that forms the socket.

In particular he does not teach using any such geometry for attachment of legs to other structural elements. Indeed he does not use it for attachment of the legs of his cart to the upper body portions or crossmember portions of the same cart—or for any transversely extended structural member.

Ristow's 1953 invention does not appear to have been adopted by the furniture industry (even for attaching legs together), or the building industry, frame-structure industry or any other industry related to the present invention as mentioned earlier.

Despite the existence of all these known methods and systems, many industries continue to search for structural innovations that are still stronger and simpler, and still quicker and easier to use. In particular, the furniture and large-framework constructional arts lack a simple, easily used, economical joint and procedure for drawing one or more long and possibly stout structural members solidly into place (particularly along a longitudinal direction) in a transverse structural member—without externally threading or rotating a large-diameter member. Thus the art leaves room for considerable refinement.

SUMMARY OF THE DISCLOSURE

The present invention introduces such refinement, and provides precisely the type of joint, assembly method and resulting constructions just discussed. The invention has at least ten independently usable facets or aspects, which will now be introduced.

Although in principle usable separately for their respective benefits, to optimize enjoyment of the advantages of my invention I prefer to employ all of the several aspects of the invention together in a common constructional system and method. In preferred embodiments of all but the last (tenth) of its aspects to be discussed in this section, the invention is a structural system in which at least two members are secured together.

Now in preferred embodiments of a first of its independent aspects or facets, the structural system of my invention includes an elongated structural member having an axis. My phrase "elongated structural" is meant to distinguish a member which is merely a small internal component of a discrete connecting bracket, separate from an elongated structural member.

Thus the length of the elongated member perhaps most typically exceeds fifteen centimeters (six inches) in the case of a leg for a low structure such as a bed, for example—and in the great majority of other applications exceeds thirty-five centimeters (fourteen inches).

This elongated structural member also has an unthreaded tip. The tip is generally aligned with the axis of the elongated member.

The phrase "generally aligned" or "extends generally along" shall be understood to encompass preferred alignments that are at a distinct but shallow angle away from parallelism, as well as actually parallel. In Applicant's preferred embodiments, tips of elongated members (familiarly, "legs") of the joint are at a shallow angle, but not necessarily a very shallow angle, to the shafts of the same members. Similarly through-bolts are at a shallow angle; but not necessarily a very shallow angle, to the tips, and so on with respect to the several other uses of the phrase "generally aligned" or "extends generally along" in this text and the appended claims. This pervasive usage arises from the nature of the invention, which as can be seen deals very extensively in geometries of intermediate-size shallow angles. Correspondingly, the phrase "transversely extended" shall encompass configurations at a distinct but small angle to the perpendicular, as well as nearly or actually perpendicular. Furthermore "tapered" shall mean cut off at a shallow angle to the axis of an elongated member, in the manner and for the purposes of interacting with a receiving member in the manner of an inclined plane etc. (as with the tips of the legs in Applicant's device).

The system also includes a transversely extended structural member defining guide surfaces for receiving the tip of the elongated member. For convenience in discussing the invention I shall refer to this unit as the "receiving member".

As will be seen from the detailed descriptions that follow, the guide surfaces can take any of a great variety of forms. For instance they may be surfaces of a generally unitary cavity or receptacle, as some of the accompanying drawings show. Alternatively they may be separately formed and attached strips or like elements, as shown in others of the accompanying drawings.

In addition the system includes some means for applying protracted force to advance the tip into the receiving member in a wedging, nonthreading relationship with the guide surfaces. For purposes of breadth and generality I shall refer to these means as the "force-applying means" or "advancing means".

I use the phrase "protracted force" to distinguish separate devices, such as hammers and pneumatic percussive drives that apply force by impact or impulse—and similarly to distinguish such mechanisms as a heavy weight (e.g., a person's weight) momentarily suspended or applied in such a way as to draw two elements together. This phrase "protracted force" is not intended to imply either that the entire installation must be accomplished without pausing, or that it must take longer than some gross time interval such as a minute.

The phrase "protracted force" conveys only that force is applied for a period typically longer than representative impulse-force durations of perhaps a fraction of a millisecond to a few milliseconds. Thus the force-applying means may either pull or press, and most typically will incorporate a screw, cam, lever, or combination machine employing some other form of leverage and/or inclined-plane advancing principle.

The foregoing may be a description or definition of the first facet or aspect of the present invention in its broadest or most general terms. Even in such general or broad form, however, as can now be seen the first aspect of the invention advances the art by drawing one or more long structural members (which may have a large diameter) solidly into place in a transverse structural member—without externally threading or rotating a large-diameter member. Those skilled in the art will appreciate related benefits of the other facets of my invention, introduced below.

Nevertheless I consider it preferable to practice this aspect of my invention with certain additional features or characteristics that optimize the enjoyment of its benefits. For example, I prefer that the force-applying means include some means for retaining the tip wedged into the receiving member.

Now turning to a second of the independent facets or aspects of the invention: in preferred embodiments of this second facet, the structural system of my invention includes an elongated structural member having an unthreaded tip. It also includes a transversely extended structural member defining guide surfaces for receiving the tip of the elongated member.

This second aspect of the invention also includes some means for pulling the tip longitudinally into the receiving member. These means operate without rotating or threading the tip into the guide surfaces.

The foregoing may constitute a definition or description of the second facet or aspect of the present invention in its broadest or most general terms.

In preferred embodiments of a third of its independent facets or aspects, the structural system of my invention includes an elongated structural member having an unthreaded tip. It also includes a transversely extended structural member defining guide surfaces for receiving the tip of the elongated member.

In addition the system includes traction means defined in one of the members. It further includes a screw threaded to the other of the two members, and distinct from the elongated-member tip, for engaging the traction means to force the tip into the receiving member without threading the tip itself into the guide surfaces.

As will be seen, with respect to all embodiments of the invention that employ a traction means, I prefer to implement the traction means as a notch that is preformed into the one member. The notch provides orderly, smooth and tidy drawing-up of the two members together, with a minimal amount of cocking or sideways angling of the surfaces relative to each other—which might impair smooth operation.

Alternatively, however, the traction means can be formed in the material of the one member by the action of the screw biting into the surface of that one member. In this case the traction surface is formed in the process of the first use of the screw to assemble the system, and thus is inherent in the system at manufacture.

In preferred embodiments of a fourth of its independent facets or aspects, the structural system of my invention includes an elongated member having a tip. It also includes a receiving member. The receiving member includes at least two interfitted crosspieces shaped and cooperating to define guide surfaces for receiving the tip of the elongated member.

In preferred embodiments of a fifth independent facet or aspect, the structural system of my invention secures together at least two structural members for supporting at least a normal adult person or comparably heavy object. Naturally the purpose of this latter limitation is to ensure that the system will not fail under the weight of at least any normal adult human; therefore of course the limitation shall be understood to refer to maximum normal weight, ordinarily taken as roughly 210 pounds for a man of maximum normal height and heavy frame; and the system will then support lighter people as well. This system includes a substantially stationary elongated and generally vertical structural leg.

The leg has a segment with a transverse dimension of at least three centimeters and a longitudinal dimension many times its transverse dimension. The leg also has a tip.

This system further includes a substantially stationary and generally horizontally extended receiving member, for supporting at least a normal adult person or comparably heavy object. This receiving member defines guide surfaces for receiving the tip of the elongated leg.

The system of this fifth aspect of my invention also includes some means for applying protracted force to advance the tip into the receiving member in a wedging relationship with the guide surfaces. These force-applying (or "advancing") means function with no necessity of rotating the leg relative to the receiving member.

In preferred embodiments of a sixth independent facet or aspect, the structural system of my invention includes an elongated structural leg. The leg has a segment with a transverse dimension of at least two centimeters, and a longitudinal dimension many times that transverse dimension. The leg also has a tip which is exclusively noncircular in external cross-section.

The system additionally includes a substantially stationary, transversely extended structural member that defines guide surfaces for receiving the exclusively noncircular external cross-section of the tip.

Also the system includes some means for applying protracted force to advance the exclusively noncircular external cross-section of the tip into the receiving member in a wedging relationship with the guide surfaces. These force-applying means function without rotating the leg or its tip relative to the receiving member.

In preferred embodiments of a seventh of its independent facets or aspects, the structural system of my invention includes an elongated structural member having an axis, and having a tip that is generally aligned with the axis of the elongated member. The system also includes a transversely extended structural member, which defines guide surfaces for receiving the tip of the elongated member.

Additionally part of this system are some means for forcing the tip into the receiving member in a wedging relationship with the guide surfaces and for retaining the tip wedged into the receiving member. The receiving member and elongated member are parts of a constructional set, which may be any of these:

(1) a set in which the receiving member is a support portion of an article of furniture and the elongated member is a leg of said article of furniture, (2) a set in which the receiving member is one support portion of a building frame and the elongated member is another portion of the building frame, (3) a set in which the receiving member is a support point of an article of play equipment and the elongated member is a leg of the article of play equipment, (4) a set in which the receiving member is a temporary structure such as bleachers, risers, a scaffold or a portable stage for performances, and the elongated member is a leg of the temporary structure, (5) a set in which the receiving member is one portion of a crane or boom frame and the elongated member is another portion of the crane or boom frame, and (6) a set in which the receiving member is one portion of a framework having plural interlocked layers of framing and the elongated member is another portion of the framework.

This system further includes, respectively, the article of furniture, or building, or play equipment or temporary structure, or crane or boom frame, or framework.

In preferred embodiments of an eighth of its independent facets or aspects, the structural system of my invention includes an elongated member having an outer surface. A transverse notch is defined in the outer surface. The elongated member has a tip that is generally aligned, longitudinally, with an axis of the elongated member.

Also included is a transversely extended structural member defining guide surfaces for longitudinally receiving the tip of the elongated member. A screw engaged with the notch, and threaded into the receiving member, pulls the elongated member longitudinally into the receiving member in a wedging, nonthreading relationship with the guide surfaces.

In preferred embodiments of a ninth of its independent facets or aspects, the structural system of my invention includes an elongated member having an outer surface, and having a transverse notch defined in the outer surface. The elongated member has a tip generally aligned, longitudinally, with an axis of the elongated member.

A transversely extended structural member defines guide surfaces for longitudinally receiving the tip of the elongated member. A fastener, which is engaged with both the notch and the receiving member, retains the tip wedged into the guide surfaces.

In preferred embodiments of a tenth of its independent aspects or facets, the invention is a structural system in which at least two members are secured together. The system includes an elongated member having original uncut surfaces, and having a tip.

The tip has two beveled planar surfaces. In three dimensions, these two surfaces lie at substantially a right angle to each other. They lie at compound angles, however, to the original uncut surfaces.

The system also includes a receiving member which defines guide surfaces for receiving the tip of the elongated member. Preferably the compound angles when expressed in degrees are irrational numbers—advantageous relationships for calculating these values are presented elsewhere in this document—and the compound angles include a tilt angle between about one and ten degrees.

In preferred embodiments of an eleventh of its independent facets or aspects, my invention is not a structural system but rather a method. It is a procedure for securing together at least one elongated structural member that has an unthreaded tip and at least one transversely extended structural member that defines guide surfaces for receiving the tip.

The method of this tenth aspect of my invention includes the step of forming a traction surface in the elongated member It also includes the step of providing an inclined-plane element such as a screw or cam.

Another step is fixing to the transversely extended structural member a mating element for engaging and cooperating with the inclined-plane element. Yet another is inserting the tip into the transversely extended structural member for engagement of the tip with the guide surfaces.

Still another step is engaging the inclined-plane element with the traction surface and the mating element. An additional step is operating the inclined-plane element to pull or press the tip into a wedging, nonthreading relationship with the guide surfaces.

Although preferred embodiments of the invention in each of its major facets thus provide very significant advances relative to the prior art, nevertheless for greatest enjoyment of the benefits of the invention it is preferably practiced in conjunction with certain other features or characteristics which enhance its benefits. For example, although the several aspects of the invention may in principle be practiced separately, it is preferred that all be used in mutual conjunction together.

All of the foregoing operational principles and advantages of the present invention will be more fully appreciated upon consideration of the following detailed description, with reference to the appended drawings, of which:

BRIEF DESCRIPTION OF THE DRAWINGS

FIG. 7 is a perspective or isometric view of a preferred embodiment that is a table, particularly a glass-topped table, showing relatively massive legs in the general configuration of FIGS. 5 and 6 (four legs at each joint);

FIG. 8 is a like view of a similar table construction but with legs of a more common cross-sectional thickness for ordinary utilitarian furniture;

FIG. 9 is a like view of still another table construction but with relatively very delicate, gracefully downward-tapered legs;

FIG. 15 is a like view of a preferred embodiment that is a space frame, and which is also representative of constructions useful in scaffolds, bleachers, risers, platforms, booms and the like;

FIG. 18 is a like view of a preferred embodiment, related to the space frame of FIG. 15, that forms bleachers for an audience at sporting events and the like;

FIG. 19 is a like view of an elemental embodiment analogous to FIG. 5 but showing a unitary formed pocket—rather than a receptacle created by cooperation of two intersecting crossmembers (for some purposes this view may be regarded as drawn partly broken away, but alternatively it is possible that what is shown may be the entire receptacle);

FIG. 20 is a perspective or isometric view of an embodiment that has legs of one or more arbitrary cross-sections, and matching pockets;

FIG. 20a is a plan view of the pockets in the FIG. 22 embodiment;

FIG. 30 is a somewhat conceptual two-stage diagram showing in principle how the offcuts are geometrically related to the stock, through the desired inclination angle of the leg but also representing how a leg may be cut from stock using a milling machine or the like;

DETAILED DESCRIPTION OF THE PREFERRED EMBODIMENTS

Figure 1:
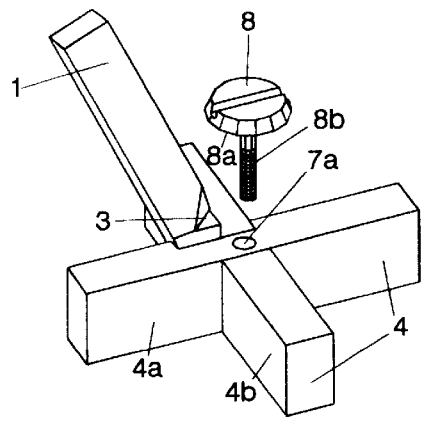
FIG. 1 is a perspective or isometric view of an elemental structural system, according to a first preferred embodiment of my invention, having a single elongated structural member or leg—the system being shown inverted with respect to many common applications such as furniture legs.

In some preferred embodiments of my invention a relatively long leg 1 (FIGS. 1, and 1*a* through 1*g*, and 2 through 6) or other like structural member is tooled or cast to form a tip 2, preferably tapered as shown, and a notch 3. The tip mates into a unit joint or node, which advantageously may be formed at the intersection of two crosspieces 4.

The tip 2 is generally aligned with the axis of the long leg 1—but not symmetrically. As will be seen, I prefer to form the tip by tapering only two adjacent surfaces of the leg, leaving the other adjacent two surfaces undisturbed. (Some minor advantages, however, do accrue from grooving the corners of the adjacent two surfaces, where they intersect the tapered surfaces—as shown at right in FIG. 20.)

Details of the legs appear in FIGS. 1*a* through 1*d*. Particularly noteworthy is the relationship between the tip bevel angle B (FIG. 1*e*) and complementary crossmember mitre angle B'. The vertical right-side constraining surface 5' does not actually engage a surface of a leg 1—but engages and orients a surface of the mating crossmember 4*b* so that its surface which does engage the leg surface is vertical. The angled left-side constraining surface 5 lies at a very shallow canting angle or tilt angle B" to the vertical rear constraining surface 5", to match a corresponding tilt angle of the beveled leg surface as will be explained more fully later in this document.

Figure 1A:
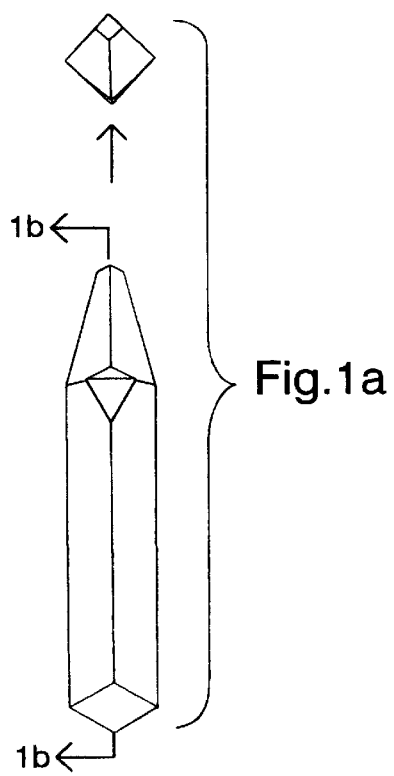
FIG. 1a is an orthographic projection of a representative leg for use in the FIG. 1 embodiment—and for each of the further embodiments described below as having the same sort of leg—(the projection being taken at right angles to the axis of the leg and facing straight-on toward a notched corner) together with an end view indicating the direction from which the orthographic projection is taken.
Figure 1B:
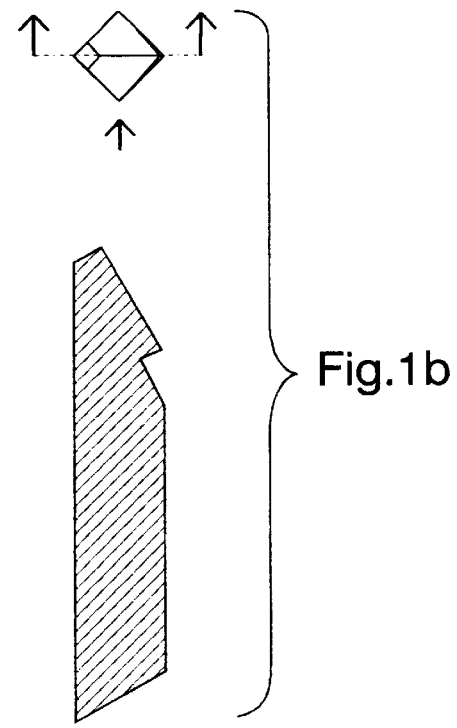
FIG. 1b is a longitudinal section of the FIG. 1a leg, taken along the line 1b—1b in FIG. 1a, also together with an end view indicating the direction from which the longitudinal section is taken.
Figure 1C:
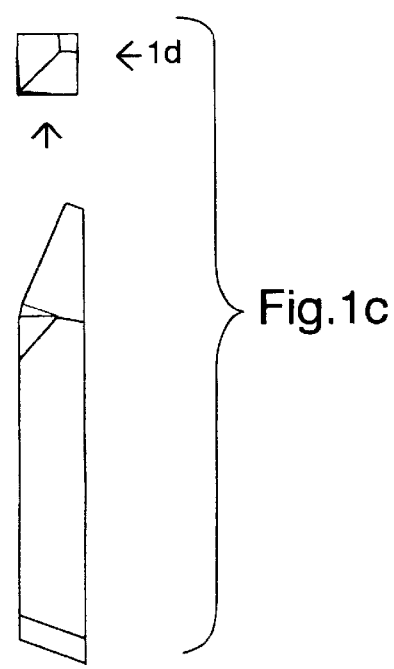
FIG. 1c is another orthographic view of the FIG. 1a leg, but this one taken facing straight-on toward one of the two flat faces which intersect the above-mentioned notch, also together with an end view indicating the direction from which this orthographic view is taken—and further indicating the direction from which the next view, FIG. 1d described below, is taken.
Figure 1D:
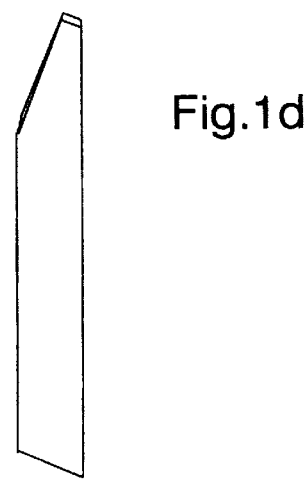
FIG. 1d is still another orthographic view of the same representative leg, but taken facing straight-on toward one of the two flat faces which do not intersect the notch.
Figure 1E:
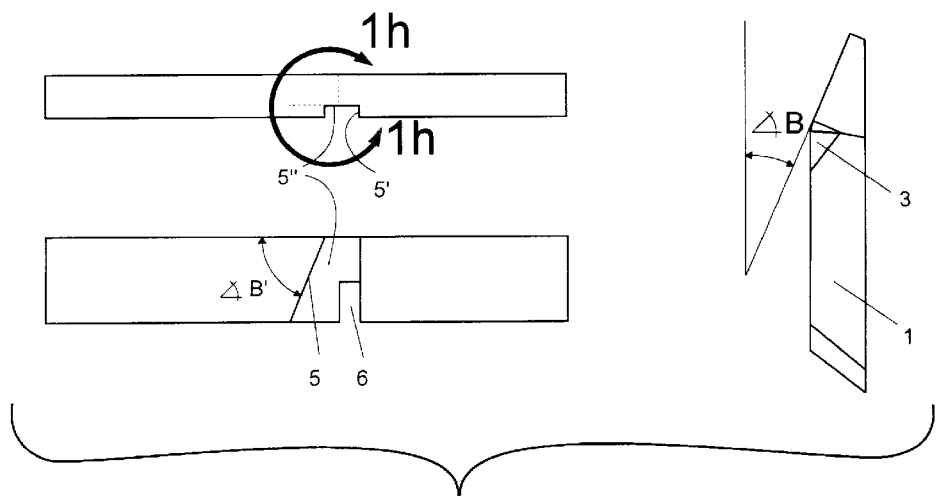
FIG. 1e includes a view like FIG. 1c of the same leg, but also showing coordinated therewith an elevational view and a plan view of a representative crossmember—and particularly showing the angular relationship between the bevel angle of the leg tip and the mitre angle of the crossmember.
Figure 1F:
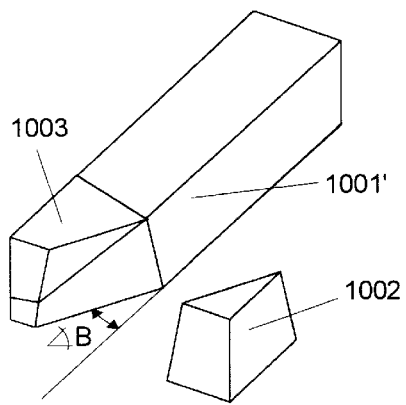
FIG. 1f is a perspective or isometric view of the tip region of the same leg, showing a first offcut moved aside—and a second cut begun—for tapering of the leg tip.
Figure 1G:
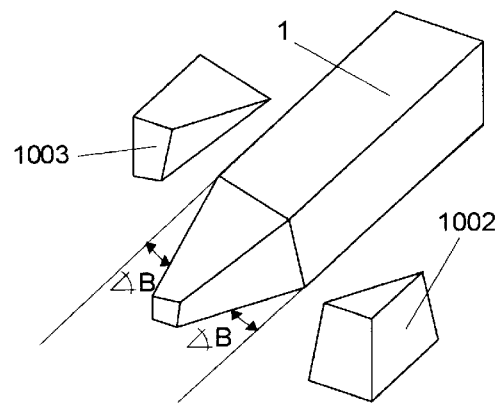
FIG. 1g is a like view of the same tip region with two offcuts moved aside.
Figure 1H:
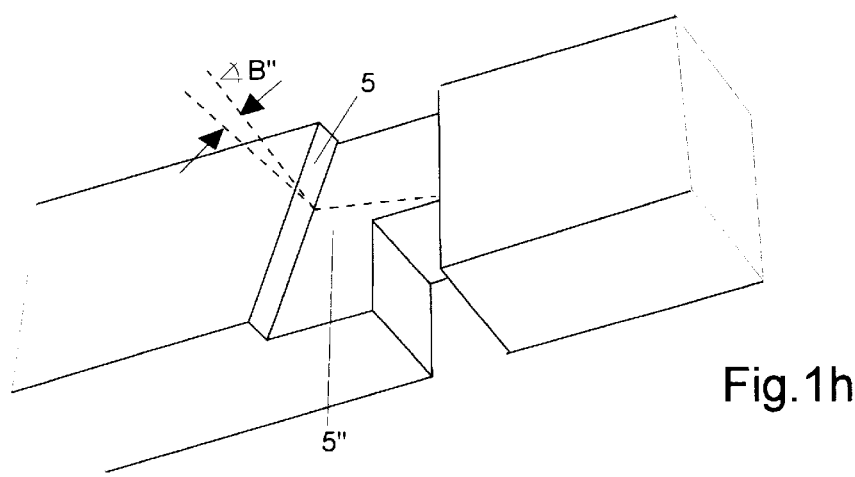
FIG. 1h is an isometric view, highly enlarged, of the portion 1h—1h in FIG. 1e.

FIGS. 1*f* and 1*g* show how the tapered tip 2 of the leg is formed from an initial piece of stock 1001. The tip is created in two successive angled cuts—removing a first offcut piece 1002 to form an intermediate form 1001', and then a second offcut piece 1003 to form the finished leg 1.

Both cuts are most typically made at a common angle B to the respective reference faces. Further detail as to determination of the primary bevel angle B—and also a slight but necessary secondary canting or tilting of the beveled faces (not conspicuous in FIGS. 1*f* and 1*g*)—and methods for obtaining these angles, is presented later in this document.

The leg 1 or the like is most typically at least two or three centimeters in transverse dimension, and many or at least several times that dimension in length. At least the external surfaces of the tip 2 are advantageously unthreaded, and indeed the external surfaces advantageously of exclusively noncircular cross-section.

Such a cross-section enables particularly inexpensive formation. Avoiding the necessity of threading the outside of an element three or more centimeters in diameter represents another economy. Moreover, as mentioned earlier, external threading of the tip would imply a need for relative rotation with respect to the remainder of the joint, in assembly or disassembly, and such rotation is in itself adverse to convenient use.

Figure 11:
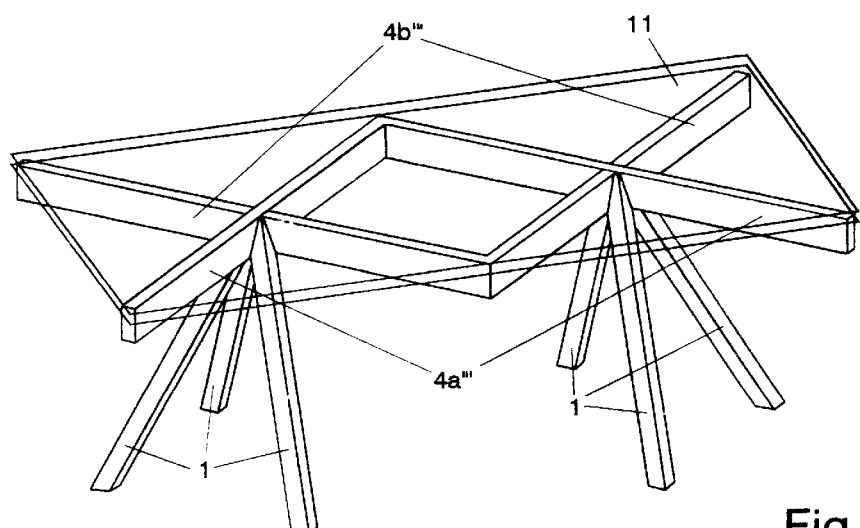
FIG. 11 is a like view of yet another preferred table embodiment similar to that of FIGS. 5 and 6 but having three legs at each joint.
Figure 12A:
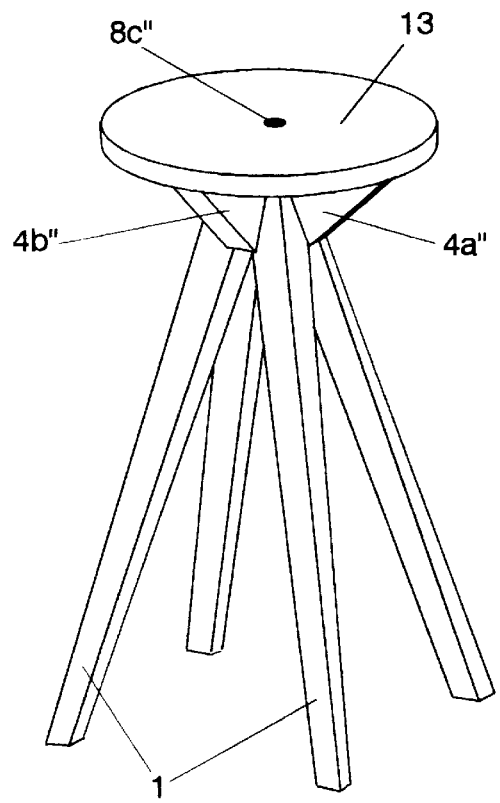
FIG. 12a is a like view of a variant of the FIG. 12 embodiment.

The invention works well with a single leg 1 at each node (FIGS. 1, 2, and 14), or with two legs 1 (FIGS. 3, 4 and 10, 13, 13*a*), three legs (FIG. 11), or four legs (FIGS. 5 through 9, 12 and 12*a*). Certain variants may be constructed with greater numbers of legs, or with three legs, at each node as will be seen.

Each leg 1 is pulled or pressed (by means to be introduced shortly) into place in a wedged relationship with receiving guide surfaces 5 of a receptacle that is most preferably formed by very simple tooling of the two crossmembers 4. As will be seen later, other forms of my invention do not depend in this way upon cooperating crosspieces 4 to form a receptacle.

In those forms which do use this arrangement, mating notches 6*a*, 6*b* facilitate fitting of the two crosspieces 4 together into a solid frame unit. That is to say, one notch 6*a* is formed in one of the crossmembers 4*a*, and another complementarily shaped notch 6*b* in the other crossmember 4*b*.

The crossmembers 4*a*, 4*b* each extend transversely from the intersection (node). Each crosspiece may be relatively rather short, as shown for convenience of illustration, or may extend for considerable distances such as a half-meter to many meters in one or both directions from the node.

The guide surfaces 5 are formed immediately adjacent to the notches 6, and in similar fashion—that is, one pair of guide surfaces 5*a* is formed in one crossmember 4*a*; and another pair of guide surfaces 5*b* is formed in the other crossmember 4*b*. The first pair of guide surfaces 5*a* is mutually angled, constituting a corner; similarly the second pair of guide surfaces 5*b* also makes up a corner.

The first guide-surface pair 5*a* limits movement of the tip with respect to two degrees of freedom—but only along one direction for each degree of freedom (e. g., forward and leftward). Similarly the second guide-surface pair 5*b* also limits movement of the tip with respect to the same two degrees of freedom, but now along the opposite directions (e. g., rearward and rightward, respectively). Accordingly the cooperative effect of the two interfitted crossmembers is to capture the tip completely with respect to the two degrees of freedom.

A hole 7, most typically vertical, is formed through both crossmembers. A screw 8 passes into the hole 7 and is drawn up so that the screw head 8*a* (or a washer held beneath the head 8*a*) engages the notch 3 of the leg 1, pulling the notch 3 toward the crosspieces 4 and thereby wedging the tip 2 very tightly against the guide surfaces 5.

A particularly striking and advantageous aspect of my invention is that one single screw 8 can be used to tightly jam more than one leg 1 into position, in one single common assembly step. Merely by way of example, one screw 8 presses all four legs of FIGS. 5 and 6 into their strongly wedged relationships with the guide surfaces 5*a* ", 5*b* ".

For greatest economy the screw shank 8*b* may be a tapered, self-threading screw which forms its own threads in the hole 7*a*. Alternatively the shank 8*b* may carry a machine-screw thread, and a nut 8*c* may be provided, and preferably fixed, at the opposite side (the bottom, as illustrated in FIGS. 1 through 6) of the joint.

For greatest strength and convenient reliability of assembly, disassembly and reassembly of wooden constructions I prefer to use a type of nut 8*c*, available inexpensively as common carpentry hardware, which is embedded into the material of the node so as to be approximately flush at that far side. The nut 8*c* thus resides in place when the joint is not assembled, so that the person performing the assembly need not hold the nut 8*c* in position while threading in the screw 8. As compared with the more economical self-threading-screw approach, use of a machine-screw shank 8*b* and embedded nut 8*c* enhances smooth operation of the wedging action for numerous disassembly and reassembly cycles.

As will be understood, various equivalent means of providing a machine-screw thread are available. A threaded insert, for example, may be substituted.

For a single leg 1 (FIGS. 1 and 2), each guide surface 5a, 5b is formed only on one side of the respective crossmember 4a, 4b. Furthermore each guide surface extends only in one direction, along that crossmember, from the respective notch 6a, 6b.

If desired, one or both ends of the leg 1 can be cut off at appropriate lengths and angles to align with nearby or mating surfaces for esthetic or functional purposes. The tip, for instance, can be cut so that after assembly it will be parallel and approximately flush with the crosspiece surfaces at the remote side (bottom, as drawn in FIGS. 1 and 2); and the foot can be cut so that after assembly it will likewise be parallel with the crosspiece surfaces—and therefore will present a flat bottom surface to a floor or the like, on which the finished and right-side-up assembly (e. g., FIGS. 7 through 14, and 17 through 18a) will rest.

I prefer to taper the tip 2 of the leg 1, and similarly taper the mating guide surfaces 5a, 5b of the crossmembers 4a, 4b, for most-effective jamming of the tip against the guide surfaces. I prefer to use a inclination angle of about thirty-five degrees, or in any event between thirty degrees and forty-five degrees, between the leg-stock axis and vertical.

To achieve this in rectangular leg stock with configurations such as illustrated, since the inclination to the vertical is produced in part by tapering of two different flat surfaces of the stock—surfaces which are at right angles to each other—in effect the overall inclination is shared between the two flat-surface tapers. Thus neither taper is at the same angle as the desired inclination off vertical, but rather each of the two tapers is at a certain smaller angle.

Figure 2:
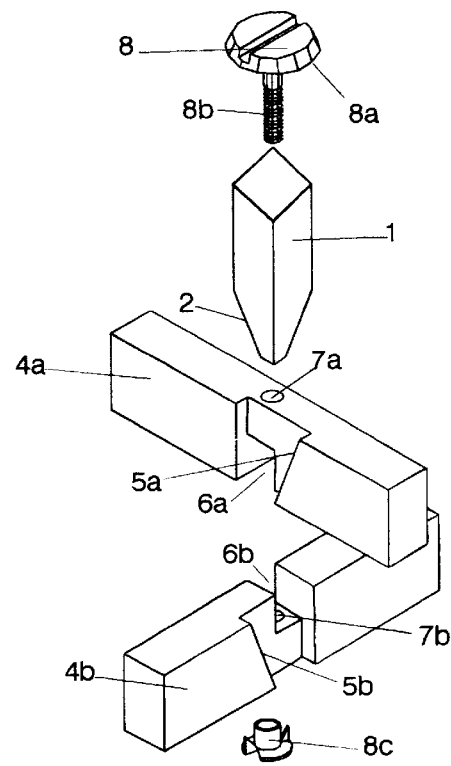
FIG. 2 is a like view of the FIG. 1 embodiment, but with the assembly drawn exploded for a clearer view of the component details.
Figure 4:
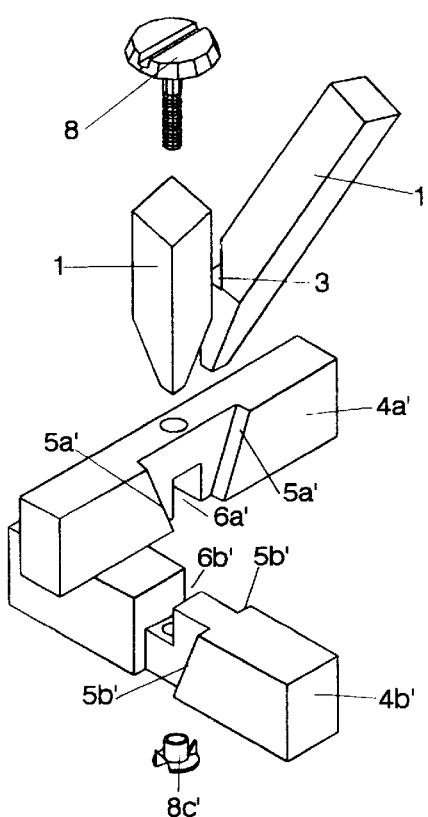
FIG. 4 is an exploded view like FIG. 2 but showing the FIG. 3 embodiment.
Figure 3:
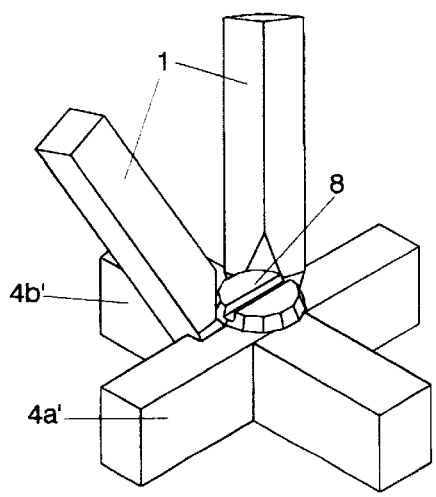
FIG. 3 is a view like FIG. 1 but showing another preferred embodiment having two elongated structural members or legs converging to a common joint.
Figure 6:
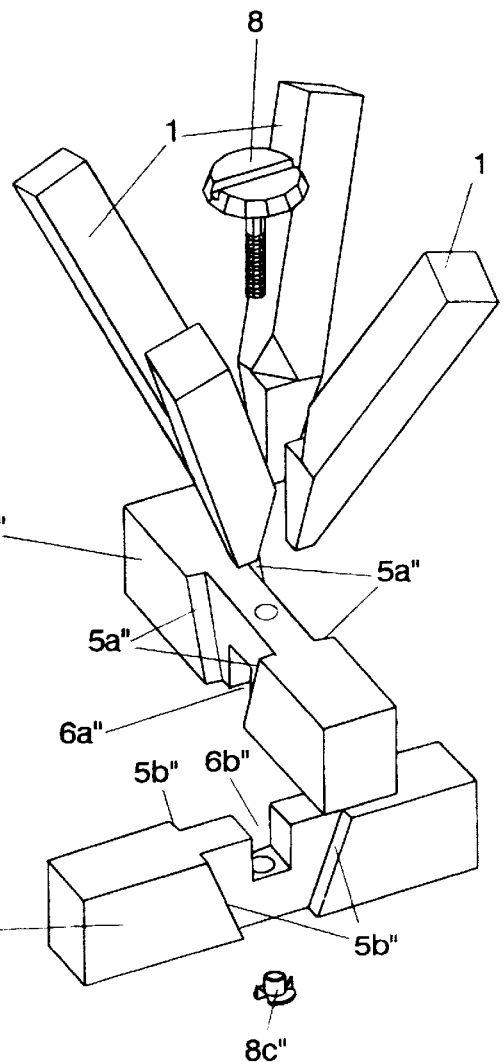
FIG. 6 is an exploded view like FIGS. 2 and 4 but of the FIG. 5 embodiment.
Figure 10:
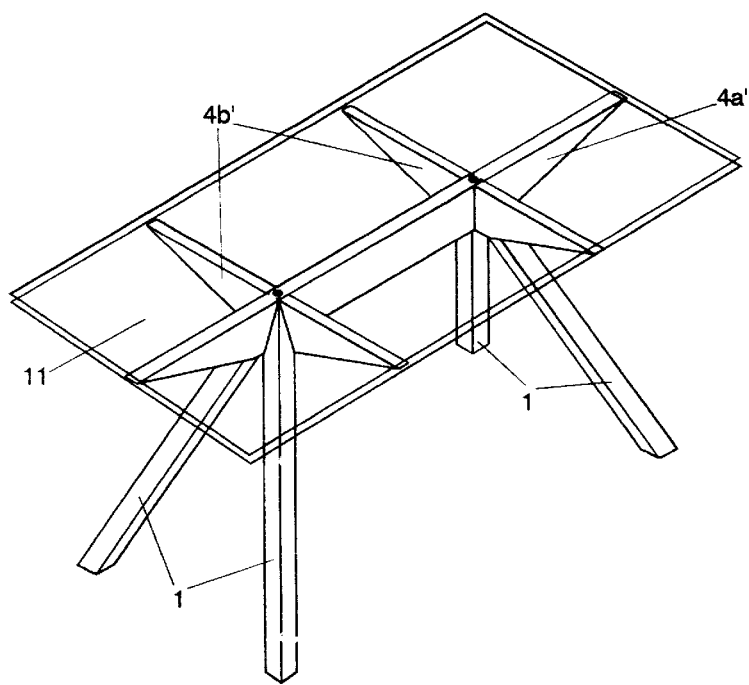
FIG. 10 is a like view of another preferred embodiment that is a table construction but using upward-tapered legs in the general configuration of FIGS. 3 and 4 (two legs at each joint)
Figure 12:
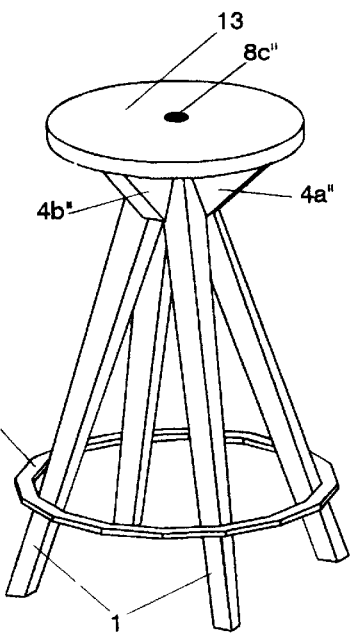
FIG. 12 is a like view of a preferred embodiment that is a tall stool, in the general four-leg configuration of FIGS. 5 and 6.

The "certain smaller angle" is, however, the same for both surfaces, if the leg is to project in a plane halfway between two constraining planes (the vertical walls of the receptacles in FIGS. 2, 3, 6 etc.). If the angle between the two constraining planes is called C, so that the half-angle to that halfway plane is $C/2$, and if the angle of inclination to the vertical is $A$, then the taper or bevel angle $B$ is given by:

$$\tan\underline{B}\left(\frac{\cot\underline{C}/2}{\sin\underline{A}} + \frac{1}{\sin\underline{A}\cos\underline{A}} - \tan\underline{A}\right) = \sqrt{2}.$$

If the crossmember planes constraining the legs are at $\underline{C}=90°$ as shown, $\underline{C}/2=45°$ and its cotangent is unity, cot $\underline{C}/2=1$. This can be substituted into the above expression; however, for a square corner a far simpler expression also applies:

$$\tan\underline{B} = \sqrt{2}\,\tan(\underline{A}/2),$$

or $$\underline{B} = \arctan(\sqrt{2}\,\tan(\underline{A}/2)).$$

Also needed is a related secondary tilt angle, which will be explained later, and which for a right-angle corner is:

$$\underline{B}'' = 2\arcsin\left(\frac{\sin(\underline{A}/2)}{\sin\underline{B}}\right) - 90°.$$

These expressions can be evaluated for any desired angle of inclination $\underline{A}$ off vertical; e. g. (still in a 90° corner):

| inclination $\underline{A}$ | bevel $\underline{B}$ | tilt $\underline{B}''$ |
|---|---|---|
| 20° | 14.00° | 1.73° |
| 30 | 20.75 | 3.84 |
| 35 | 24.03 | 5.19 |
| 40 | 27.24 | 6.72 |
| 45 | 30.36 | 8.42. |

As the above expressions show, if stated in degrees the angles are irrational (a bevel for 20° is actually 14.001942 . . . ), but can be calculated to any desired accuracy.

A skilled computer-aided-design (CAD) program operator can read off bevel and tilt angles $\underline{B}$, $\underline{B}''$ from such a program. The operator sets up leg stock at any desired inclination $\underline{A}$ and azimuth, rotated as desired about its axis (e. g., with upper and lower corners in a common vertical plane as shown), and between walls at any desired angle $\underline{C}$. The operator must understand how to choose planes in which to read the angles.

I have found that for most configurations a good tight fit of the mechanical pieces requires correct angling of the surfaces to a fairly small fraction of a degree. For the most-useful leg-inclination angles $\underline{A}$, from 7½° to 50°, in a 90° corner the tilt angle $\underline{B}''$ ranges from one to ten degrees.

If the taper surfaces come to lie against vertical surfaces of the crossmember guide surfaces, as illustrated in FIGS. 1 through 6, then the disposition of the leg with respect to the vertical is at the same angle $\underline{B}$, as seen in two different planes (but of course not in the plane of the leg axis). Variants are possible in which two guide surfaces are dissimilarly angled to the vertical, yielding different leg angles.

The leg 1 of FIGS. 1 and 2 is illustrated as angled or canted away from the vertical, therefore providing free access for the screw head 8a to move straight downward into its functional position seated on the notch. The notch is formed on a corner adjacent to two tapered surfaces of the tip.

Reasonably strong wedging, however, can be obtained even with unnotched stock—by just drawing down the screw head 8a along an inclined edge of the leg 1. Such a geometry can be enhanced, if so desired, by providing a special screw head 8a or spacer/washer (not shown) that has a complementary bevel.

Alternatively if preferred the leg can be notched on the opposite corner—the corner that is adjacent to two untapered surfaces of the tip, surfaces which are continuous and coplanar with the longer shank of the leg. The leg is then positioned vertically in the same guide surfaces.

In this case attention should be given to forming the notch in such a way as to facilitate easy approach of the screw head 8a. Also, as a person skilled in this field will now recognize, the tip and foot must be cut at different angles than for the illustrated leg—if it is desired to align the cut-off surfaces, as described above, with the crosspiece surfaces or with a floor.

To accommodate two legs 1 (FIGS. 3 and 4) at a single joint, in one crosspiece 4a' the guide surfaces 5a' as shown are formed on both opposing sides of that crosspiece 4a', but still they extend in only one direction from the notch 6a'. On the other crosspiece 4b', conversely, the guide surfaces 5b' as illustrated are formed on only one side, but they extend in both directions from the corresponding notch 6b'.

This arrangement produces a two-leg joint in which the legs 1 both extend at an angle in a common direction from one 4a' of the two crosspieces. That is, they are both positioned on a common side of that crosspiece 4a'— although they are at opposite sides of the other crosspiece 4b'. The two legs 1 occupy adjacent included angles of the intersection between the two crosspieces 4a', 4b'.

Figure 5:
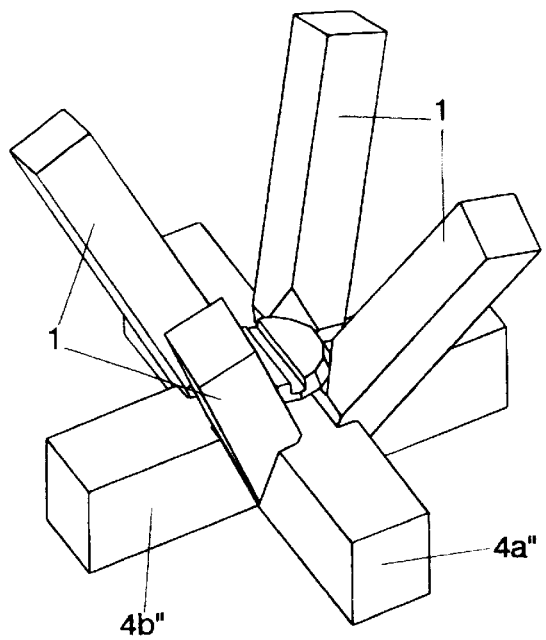
FIG. 5 is a view like FIGS. 1 and 3 but of still another preferred embodiment having four elongated structural members or legs converging to a common joint.

Both legs 1 for this construction, and for the embodiment of FIGS. 5 and 6 as well, are identical to each other and to the single leg 1 of FIG. 1. Jigs or other fixtures for forming the legs can therefore be used in making a great many different embodiments of my invention in common.

For mounting of four legs (FIGS. 5 and 6) at a single node, in each crosspiece 4a", 4b" as shown the guide surfaces 5a", 5b" are formed on both sides and extend in both directions from the respective notches 6a", 6b". From these detailed breakdowns it will be clear to those skilled in the art that a three-leg joint can be formed by using guide surfaces which are formed on both sides of both crosspieces—but which, for each crosspiece, on one of those two sides extend in only one direction from the notch. The resulting joint appears in FIG. 11.

From these detailed discussions it will also be clear to those craftsmen skilled in the art that a two-leg joint can be made with the legs extending in opposite directions from the joint—or, in other words, occupying the opposite included angles of the intersection between the two crosspieces. In this case the guide surfaces can be formed in both sides of each crosspiece, but at each side extending in only one direction from the notch.

It is important to note, however, that the crosspiece configuration for the four-leg joint, to a certain extent, can be employed in general for any of these constructions. That is to say, the crosspieces 4a", 4b" as formed for a four-leg joint can be fitted with only one, two or three legs 1 as desired; however, rigidity of the joint is sacrificed since the crosspieces are thinner where they should brace each other at the desired angle (usually, but not necessarily, a right angle). When all the legs are present, the legs fill in the voids adjacent the inside corners and provide the desired bracing.

Figure 13:
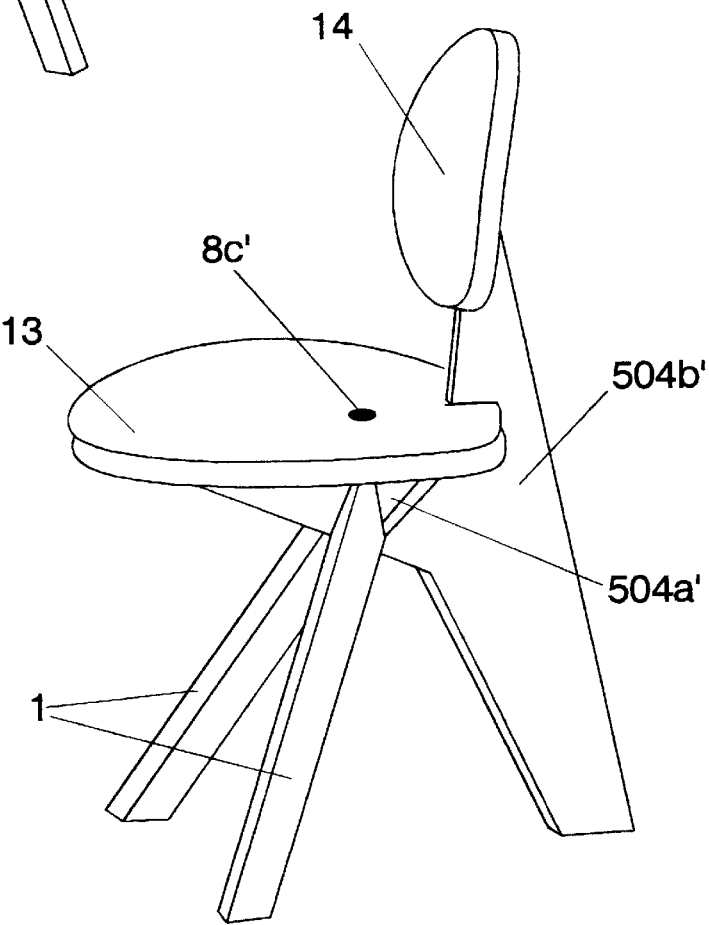
FIG. 13 is a like view of a preferred embodiment that is a low chair, having a three-leg configuration.
Figure 13A:
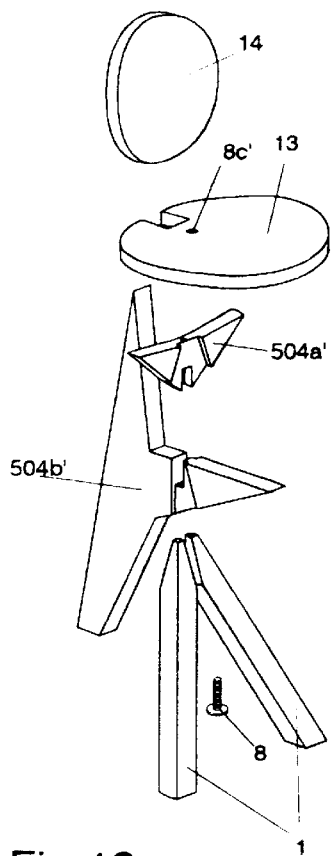
FIG. 13a is a like view, but exploded, of the FIG. 13 embodiment.

A very different approach to providing three legs—or various other numbers of legs—appears in FIGS. 13 and 13a. In this case one or more of the crossmembers 504a, 504b is extended downward to form another leg—which if desired may be considerably more massive as shown.

One or more of the crossmembers may also be extended upward and rearward as shown to support a back 14, or downward and forward (not illustrated) for a footrest. Crossmembers may be extended in various other directions to integrate any number of other functions such as support of (for example and without limitation) an armrest, writing surface, computer screen or keyboard cradle, telephone stand, planter, magazine or book rack, tool holder or beverage holder, or combinations of such features all within the scope of my invention.

As FIGS. 7 through 14 show, joints created in the manner shown and just discussed can be used to facilitate and enhance construction of a great variety of furniture—with tabletops 11 (FIGS. 7 through 11), additional braces 12 and seats 13 (FIGS. 12 through 13a), bed crossjoists (FIG. 14) and other features as desired. Through appropriate selection of the sizes, shapes and proportions of the crossmembers 4 and legs 1, a wide range of functions and esthetic effects can be obtained while maintaining a maximum of strength and stability.

Crossbracing 12 of angled legs 1 (FIG. 12) is enhanced by the fact that the entire set of legs can be moved as a unit toward the seat 13 or a tabletop 11, while each leg is individually inserted into its respective guide-surface receptacle. Bracing attachment, in other words, can be made to take advantage of the facts that the legs need not undergo rotation or spacing variations during assembly, and the leg at each position always stands in a fixed, predictable orientation.

Figure 14:
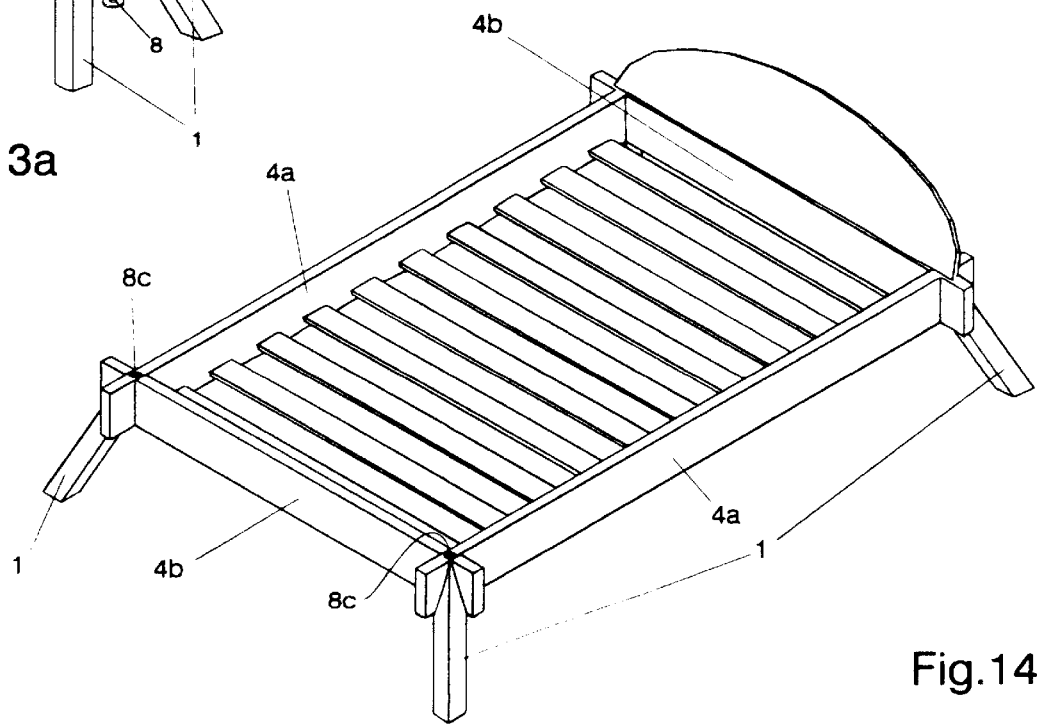
FIG. 14 is a view, like FIGS. 7 through 13, of a preferred embodiment that is a bed, in the general configuration of FIGS. 1 and 2 (i. e., one leg at each joint)

For a bed, the single leg 1 at each corner node may be angled outward as illustrated (FIG. 14). This is one application, however, in which a vertical leg (as mentioned earlier) or even an inward-angled leg may be particularly preferred.

For fitting and securing of one or more legs vertically, it is only necessary to vary the notching of the legs 1' (FIGS. 14a, 14b), forming the notches 3' on the straight sides of the legs 1' rather than the angled sides. It should first be recognized that, regardless of notching, the legs 1 or 1' fit into the receptacles either vertically or angled—simply depending on their orientations rotationally about their centerlines.

With the legs 1' notched on the straight sides, they also can be secured in the pockets while fitted vertically. The assembly is very much as in the configurations already introduced, except that the legs 1' are fitted vertically and extend vertically from the crossmembers.

Figure 14A:
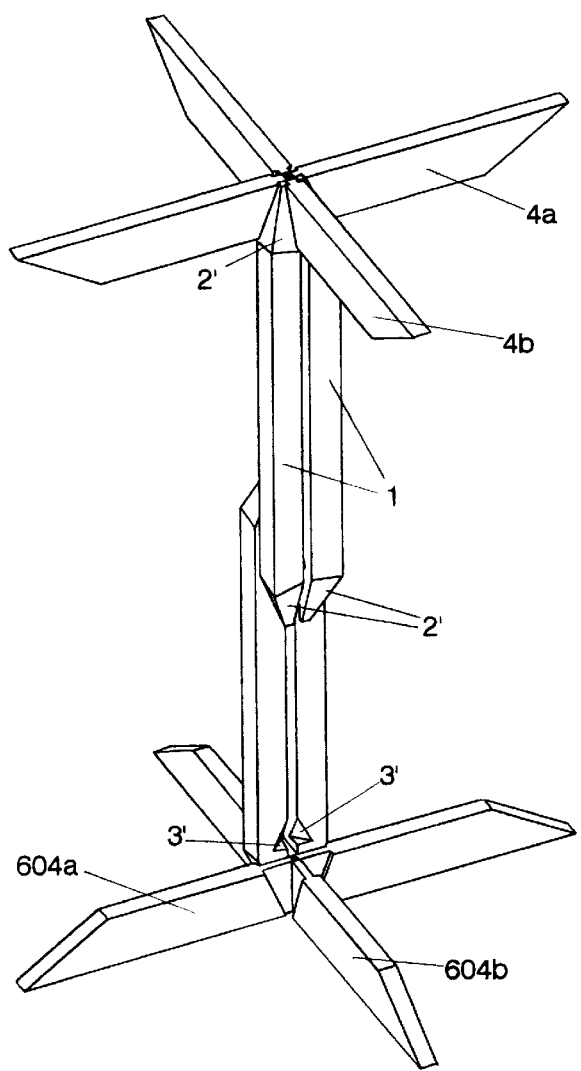
FIGS. 14a and 14b are like views, but enlarged, showing how one or more legs (four are illustrated) can be oriented vertically, rather than inclined at an angle to the vertical, to support a bed or other embodiment such as that of FIG. 14—or, as specifically shown, to interconnect crossmember sets that are vertically separated.
Figure 14B:
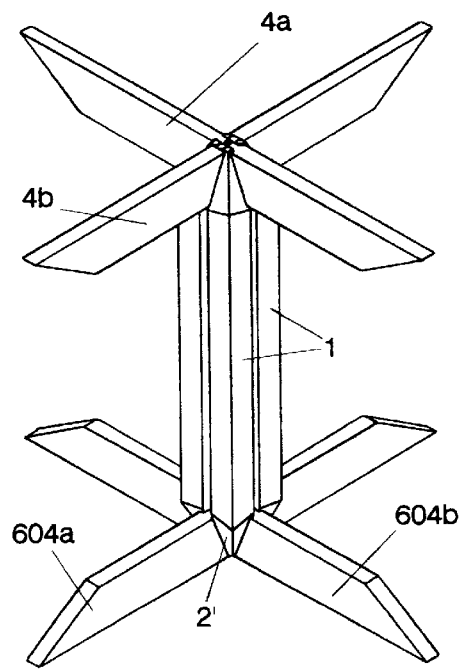

This simple arrangement is true even for two or more legs 1' as illustrated—except that, once again, suitable arrangement must be made for inserting a bolt head or other advancing/retaining-means element into the central space, which may be relatively inaccessible after all legs 1' are in place. FIGS. 14a, 14b show that the vertical leg configuration, equally as well as the angled leg configuration, can be used to link two crossmember sets—or, as these views make clear to the skilled artisan, two extended planes of crossmembers.

Matching surface alignments obtained through cutting off the tips at appropriate angles, as mentioned earlier, are particularly helpful in preserving acceptable esthetics for glass-top tables or other structures in which the tops of the crossmembers are visible. Of course it is possible to dispense with such fine touches where the articles are strictly utilitarian, or where gaps and mismatches are concealed as for instance beneath a tabletop that is opaque—or pursuant some design regimens that make a virtue of unadorned functionality.

FIGS. 15 through 18d, however, show that my invention is not limited to applications in furniture. One particularly advantageous use is in space frames and like structures having one or more additional layers or planes 4, 104 of the transversely extending structural members 4a"/4b", 104a"/104b", interconnected by the legs 1.

In this context the structural planes 4, 104 etc. need not be horizontal as shown, but rather may be vertical—or at other angles as convenient to the purpose at hand—while the "leg" elements 1 are simply interconnecting struts and may be at various angles about the horizontal. Furthermore each leg has not just one tapered tip 2, and associated notch 3, but at its remote end a second tapered tip 102 and notch 103 for engagement with the structural layer 104 at that end.

Figure 15:
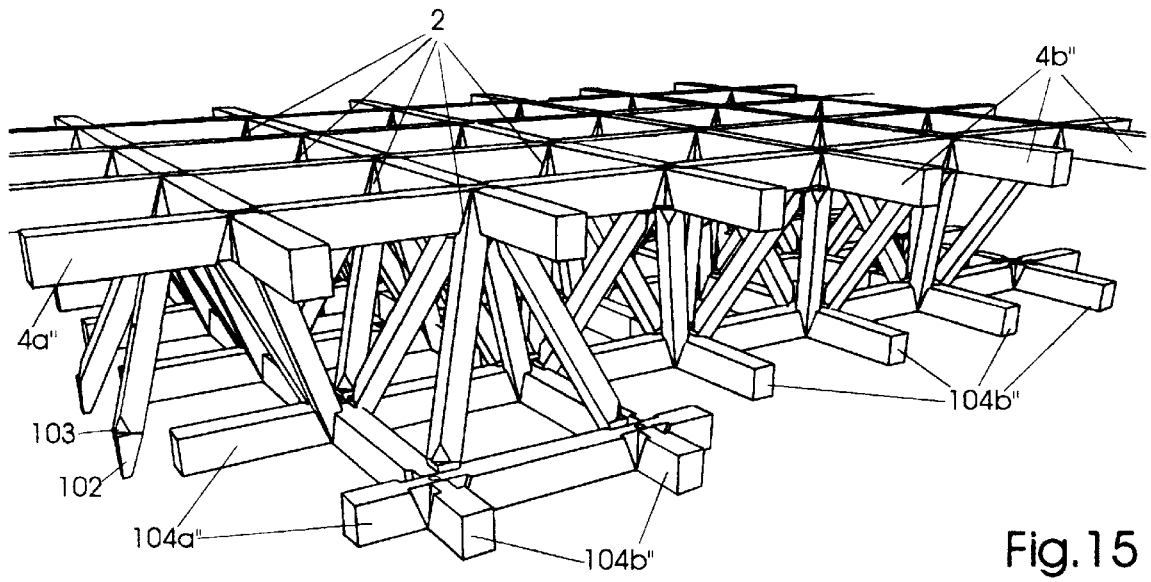

In structures of the sort shown in FIG. 15, particular benefits flow from the fact that an entire structural layer, e. g. layer 4, can be lowered together onto the upstanding legs 1 from a lower layer 104. As a practical matter, however, care must be taken in this maneuver since tolerances in the tapers and guide surfaces may create and misalignments and prevent some of the unit structures from slipping smoothly together.

Advantageously an entire structural layer 4, 104 can be preassembled and shipped to a use location, where the legs 1 are quickly assembled to one layer e. g. 104 and next layer then appended. Adaptation of the illustrated embodiment for still further layers (not illustrated) can be added simply by tooling or otherwise forming each node for insertion of a set of legs from both top and bottom, rather than only top or bottom.

In view of the principles and examples set forth above, it is believed that the application of my invention to other structural types as illustrated in FIGS. 16 through 18d will now be clear to those skilled in the art, without further discussion. The straightforward ease of assembly of my invention is an extremely valuable advantage, particularly for certain types of equipment.

Figure 16:
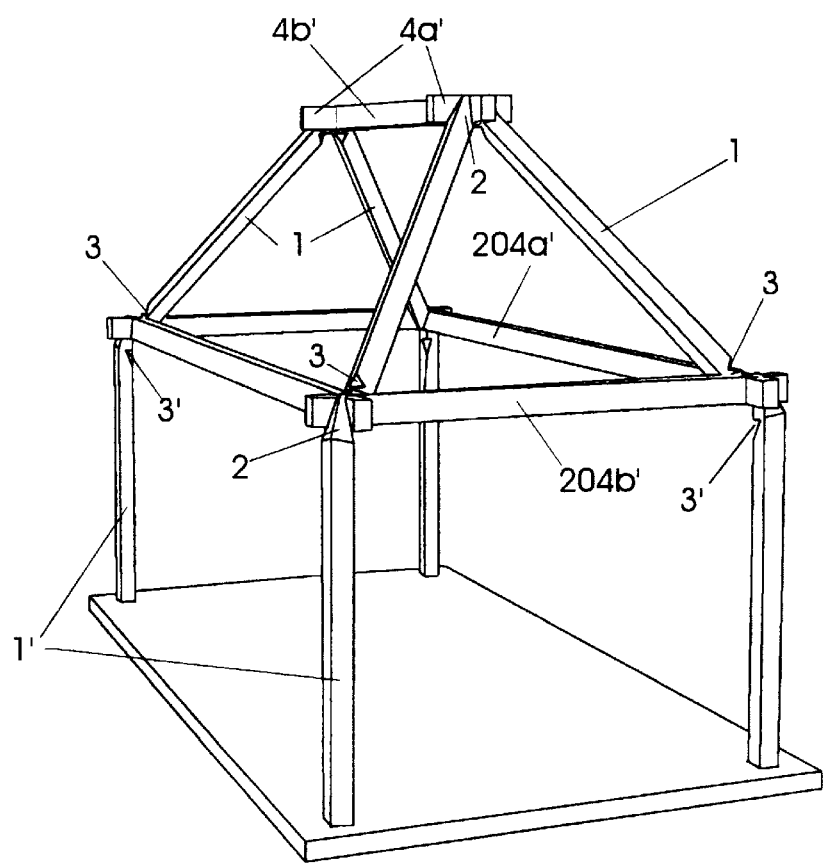
FIG. 16 and FIG. 16a are like views of preferred embodiments that are building frames, suggesting the great variety of styles and detail work that the invention can accommodate.
Figure 16A:
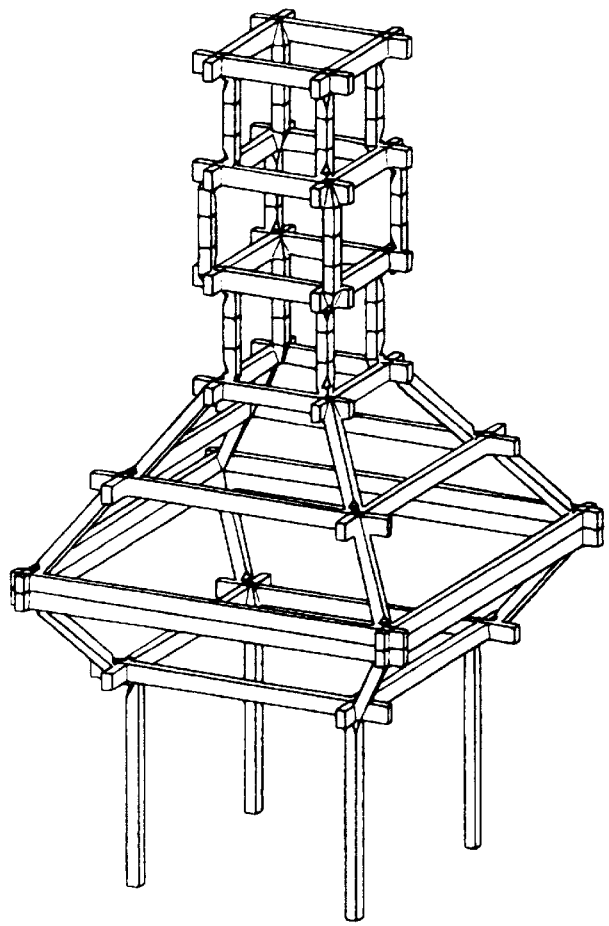
Figure 17:
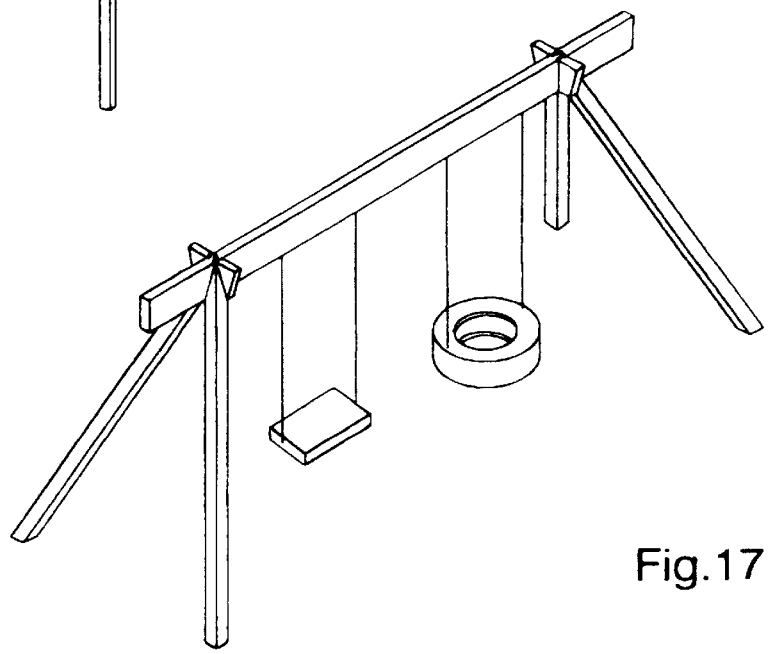
FIG. 17 is a like view of a preferred embodiment that is an article of children's play equipment.

One such category is structures that are purchased for home assembly by relatively unskilled consumers. For example these include prefabricated utility sheds or other outbuildings (FIGS. 16, 16a), and children's play equipment (FIG. 17).

Figure 18:
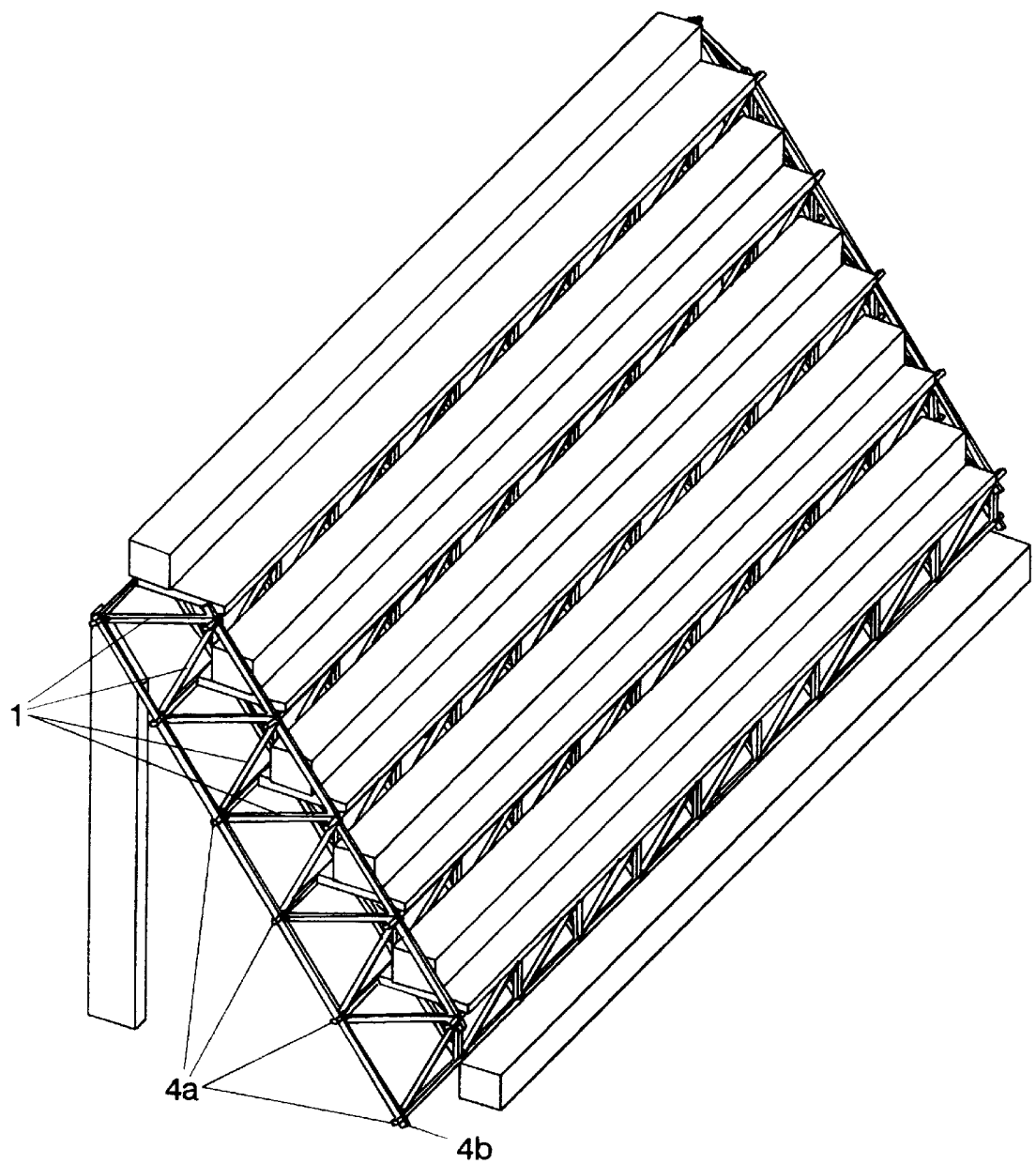
Figure 18A:
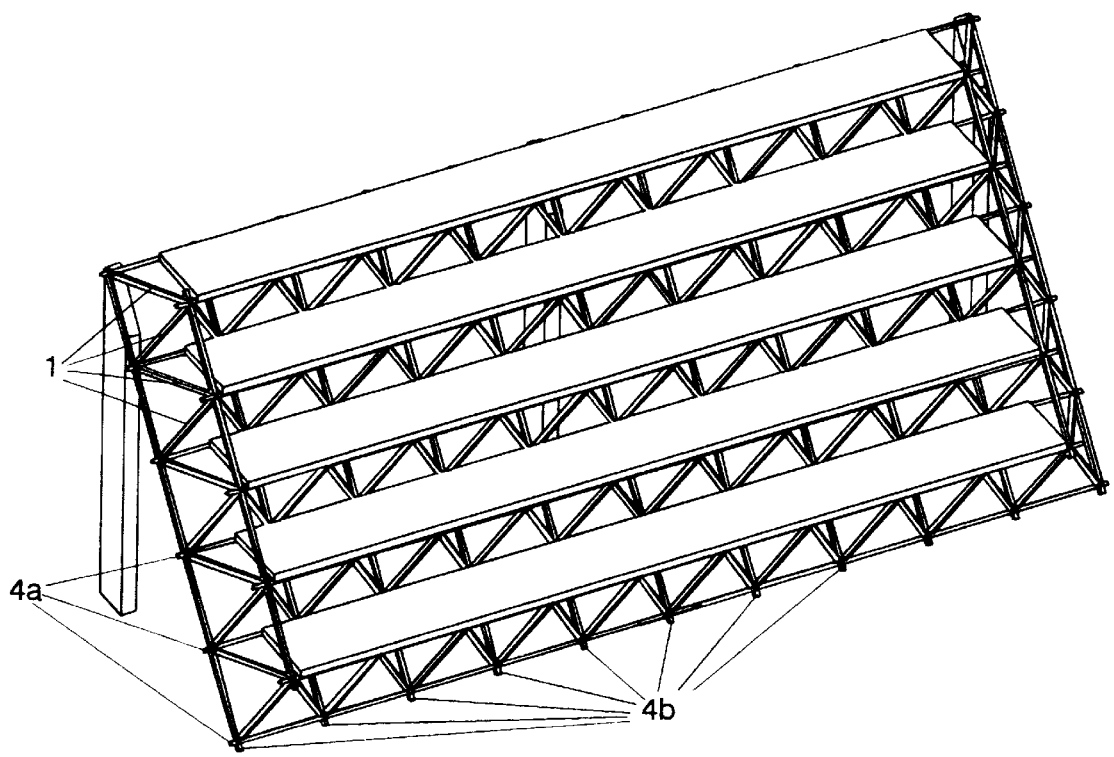
FIG. 18a is a like view of a preferred embodiment that forms risers as for a group of people being photographed, or a choir in performance.
Figure 18B:
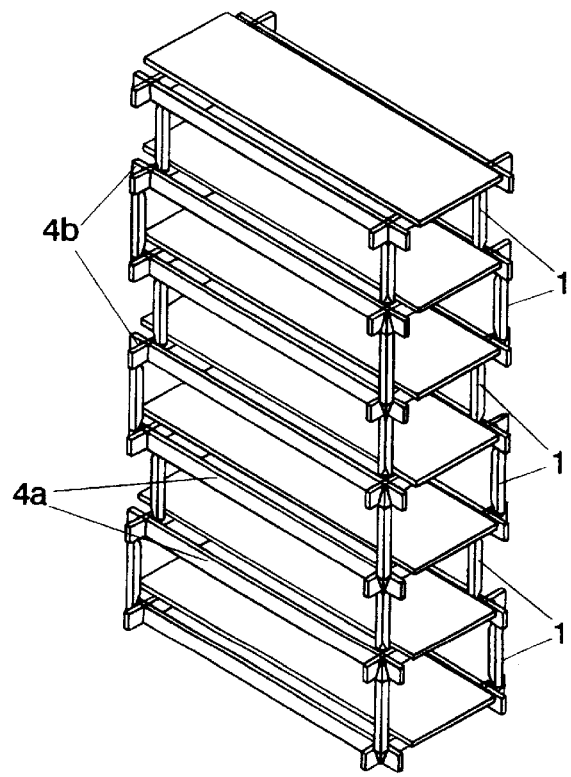
FIG. 18b is a like view of a preferred embodiment that forms scaffolding as for use in construction, maintenance or painting of another structure.
Figure 18C:
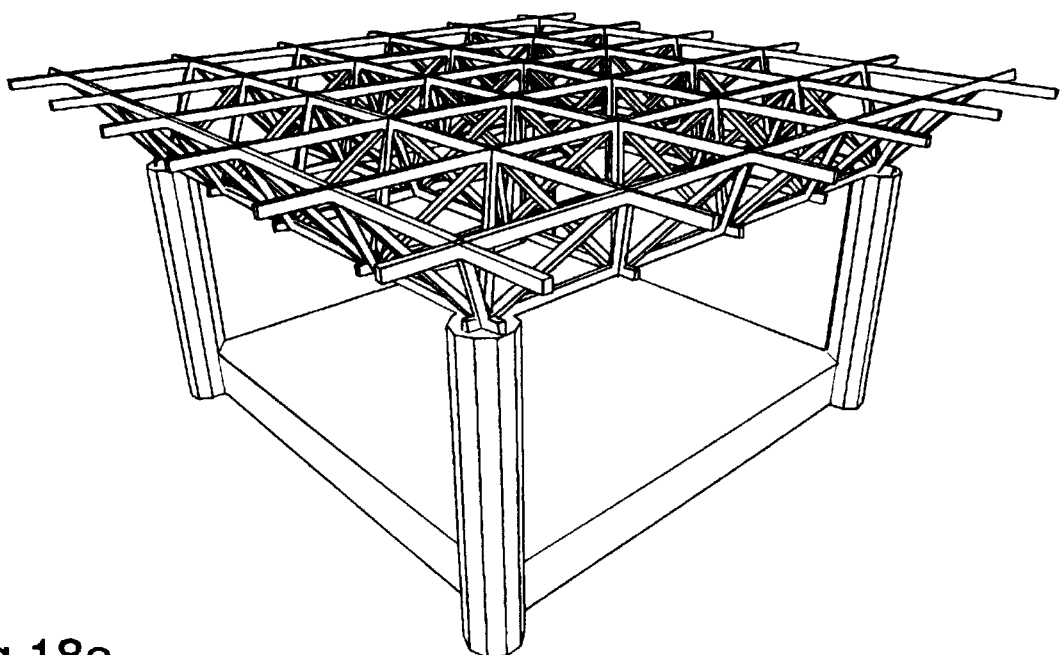
FIG. 18c is a like view of a preferred embodiment that forms a portable stage for performances.

Another such category is equipment commonly rented for assembly at a gymnasium or school, by organizers of amateur events. These may include risers (FIG. 18a) and portable performance stages (FIG. 18c).

Figure 18D:
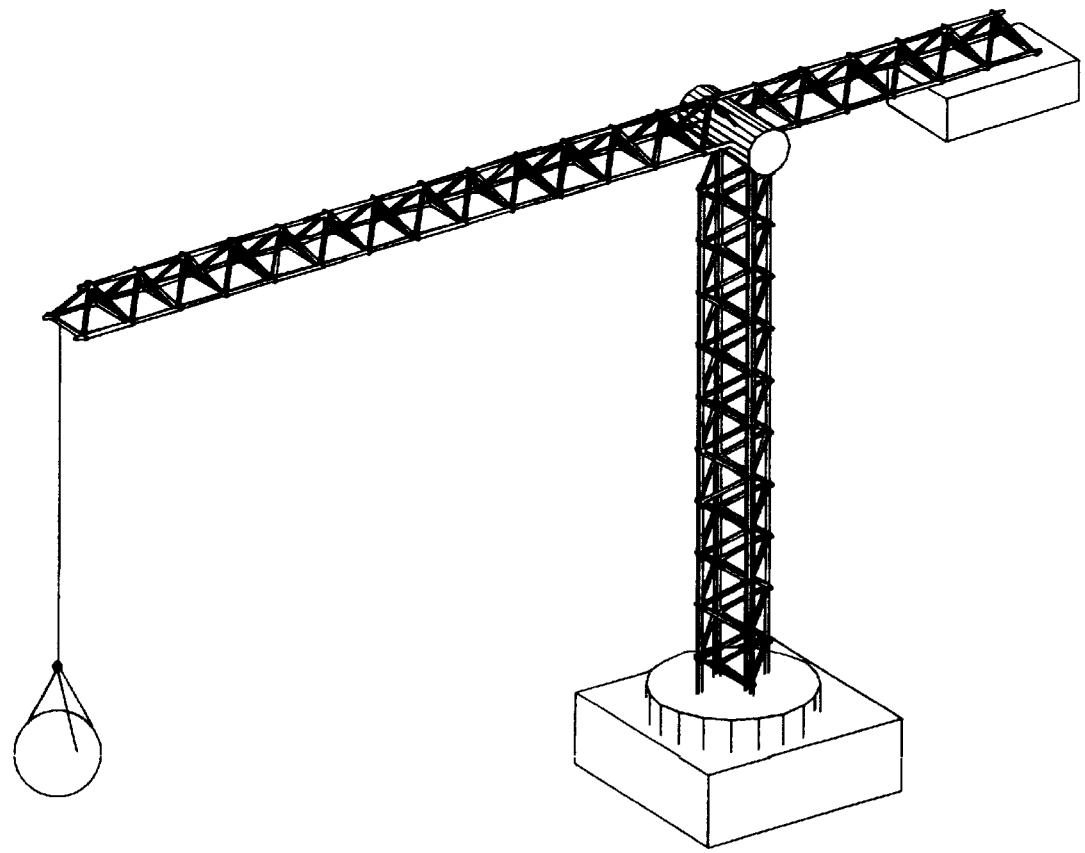
FIG. 18d is a like view of a preferred embodiment that forms a crane or boom frame.

Even professionals, however, will appreciate the shipping ease, the extreme stability and strength, and the easy assembly of my invention as embodied in heavier-duty equipment such as bleachers (FIG. 18), scaffolding (FIG. 18b), and booms or cranes (FIG. 18d).

My invention is also readily amenable to several other important variants which can be exploited to provide further preferred embodiments for special purposes. First, even though formation of guide surfaces by tooling material away from the sides of crossmembers (as in FIGS. 1 through 6) is particularly favorable for many applications, FIG. 19 shows that a receiving pocket or receptacle can be unitary if preferred.

Such a construction can be formed by either casting or machining the desired pocket or guide-surface contours in a unitary piece of material. Casting is a particularly appropriate method when the desired leg and pocket cross-sections are entirely arbitrary, as in FIGS. 20 and 20a—and my invention can be practiced quite successfully in this way.

As these drawings and those of FIGS. 1 through 6 show, the guide surfaces or pockets need not be fully enclosed. For stable capture, however, I prefer that at least some portion of each leg be surrounded by material of the corresponding pocket about more than a straight angle (i. e., one hundred eighty degrees).

Figure 21:
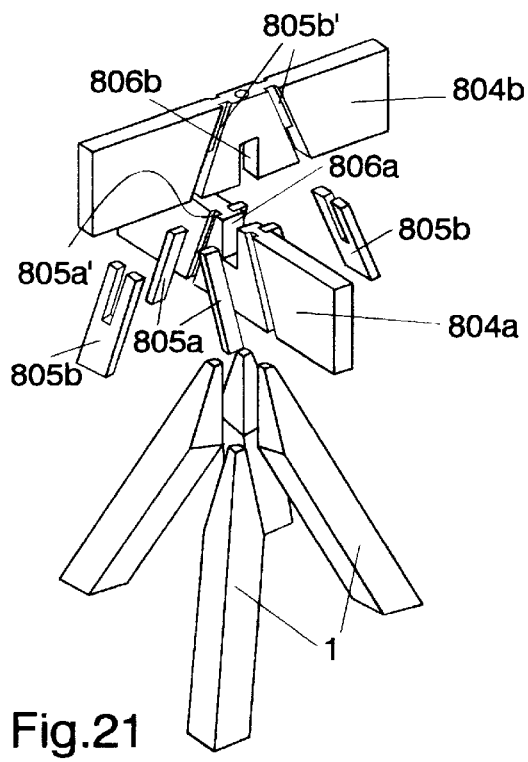
FIG. 21 and FIG. 21a are perspective or isometric views of an embodiment which uses an alternative form of receiving crossmember whose guide surfaces are provided by initially separate prefabricated strips, which are postassembled to the receiving crossmember.
Figure 21A:
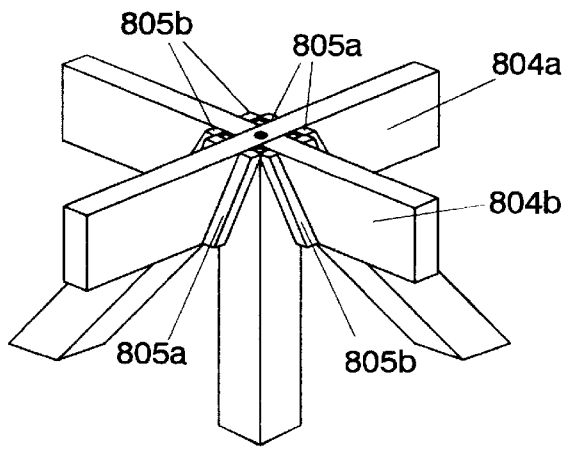

On the other hand, as FIGS. 21 and 21a show, guide surfaces may be made of separate strips 805a–or strip subassemblies 805b—which are assembled to the crossmembers as by insertion into mating notches 805a', 805b' respectively.

For a strip subassembly 805b formed in a forked shape with connecting crosspiece (at the base of the fork) between two opposed strips as shown, the notches 805b' in the crossmember 804b are advantageously undercut to receive the crosspiece.

Such constructions only require removal of material from the sides of the crossmembers 804a, 804b in the relatively small regions of the respective notches 805a', 805b, rather than the more extended regions of the entire receptacles 5, 6 as in FIGS. 1 through 6.

Figure 21B:
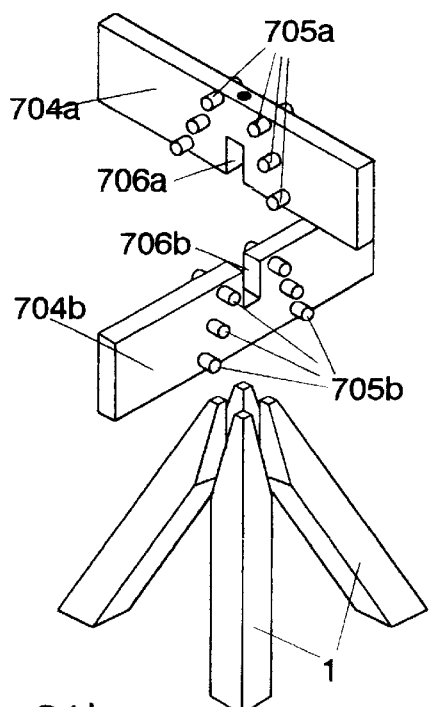
FIGS. 21b and 21c are like views but show pegs or pins substituted for the strips.

Analogously, guide surfaces need not be continuous but may be formed as the aggregate of plural pegs 705b, 705a (see FIGS. 21b, 21c) or other guiding elements which provide support only at spaced-apart locations. Such pegs, or like segmented guide elements, may be inserted into small drilled holes, thus reducing to a minimum the structural disruption of the crossmembers needed for establishment of the guiding function.

Figure 21C:
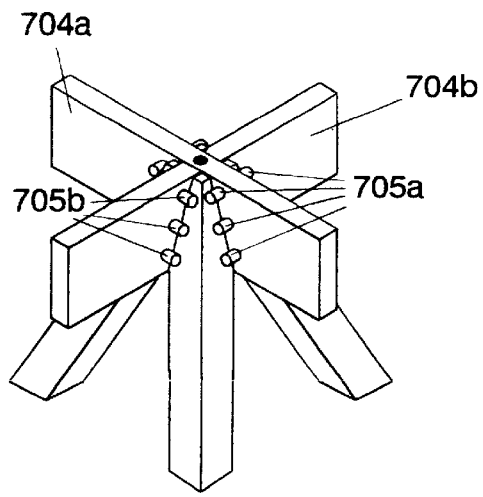

Therefore the constructions of FIGS. 21 through 21c have the advantage of more nearly maintaining the full thickness and therefore strength of the transversely extending crossmembers 804a, 804b. The FIG. 1 through 6 construction, however, has the advantages of structural simplicity, cleaner esthetics, and better-protected guide surfaces—and possibly also stronger guide surfaces.

Although I prefer to capture the leg tips by wedging against guide surfaces in two orthogonal directions, strictly speaking this is not a requirement of my invention. As FIGS. 22 and 23 suggest, the structure may be adequately stable in a free dimension A–B (FIG. 22) if:

(1) the leg 901 is strongly wedged into its guide surfaces 905 and adequately retained 8, so as to prevent the leg from sliding along that free dimension; and/or if (2) the leg 901 (particularly its tip) is adequately wide along that free A–B dimension to deter the leg from tipping over along that dimension.

Figure 22:
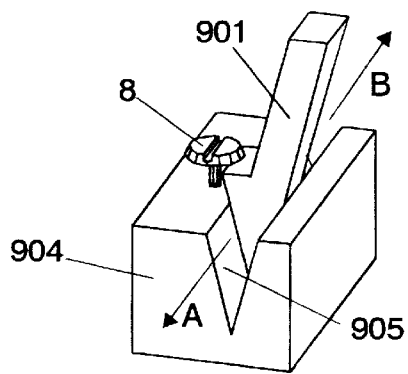
FIG. 22 is a like view of an embodiment that has legs and pockets shaped for wedging in one dimension only, with no capture along an orthogonal dimension.
Figure 23:
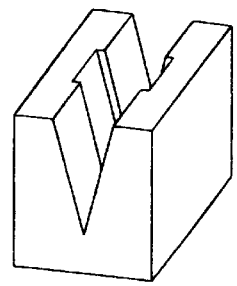
FIG. 23 is a like view of a related embodiment that wedges in one dimension only but provides nonwedging capture along an orthogonal dimension.

An alternative is to provide wedging in only one dimension, just as in FIG. 22, plus only capture in the orthogonal dimension as shown in FIG. 23. If the lateral walls are rather shallow, as illustrated, they may not contribute much to avoidance of tipping, but they prevent sliding.

While I have illustrated my invention using screws or bolts as the force-applying or "advancing" means, other devices are equally useful, depending upon the application at hand. I do greatly prefer nonimpact devices for various reasons suggested in my earlier discussion of prior art.

Figure 24:
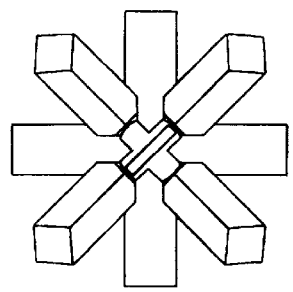
FIG. 24 is a plan of an embodiment which uses an alternative force-applying means, in the form of a rotary cam.
Figure 24A:
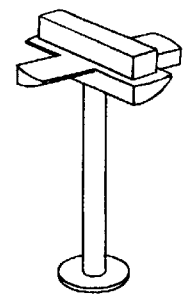
FIG. 24a is a perspective view of a force-applying means for use in the FIG. 24 embodiment.
Figure 25:
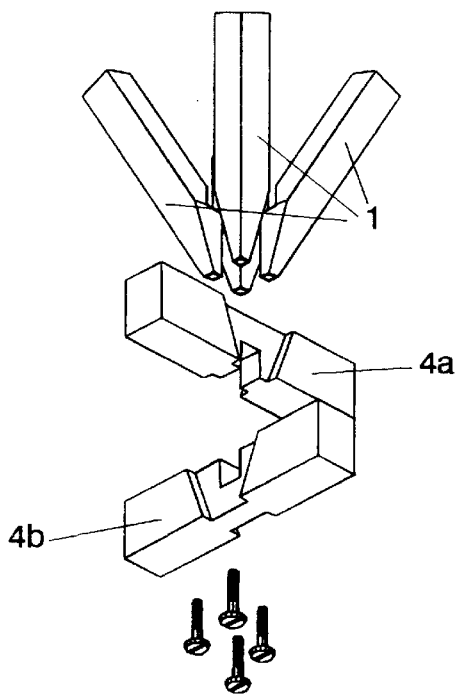
FIG. 25 and FIG. 25a are exploded and assembled perspective or isometric views like FIGS. 6 and 5, respectively, but for an assembly that employs an alternative configuration for the tip and force-applying means, in which each tip is internally threaded—and the force-applying means comprise a bolt passing downward through the crosspieces to engage the threads within each tip.
Figure 25A:
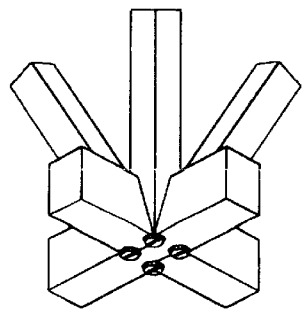
Figure 26:
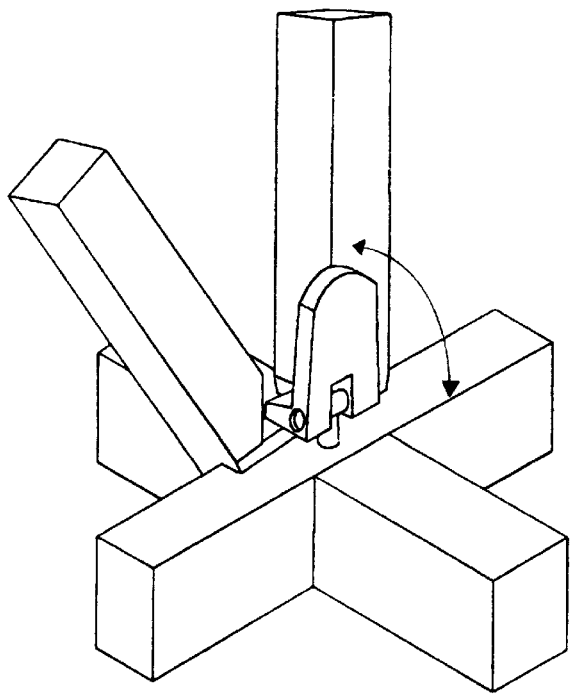
FIG. 26 is a like view of an embodiment which uses still another alternative force-applying means in the form of a lever.
Figure 27:
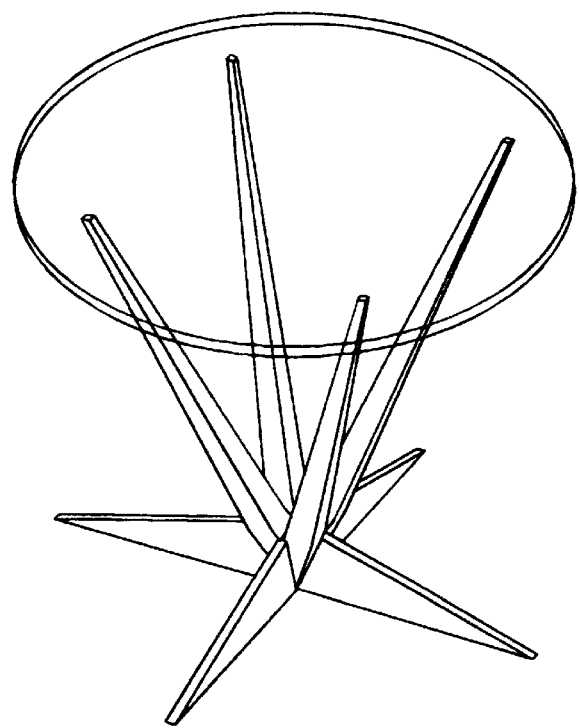
FIG. 27 is a like view of an embodiment in which the joint is inverted—with legs pointing upward—thus serving as a base to support a tabletop or other structure.

Within this broad category are such other options as horizontally rotating cams (FIGS. 24 and 24a), vertically rotating cams (not shown—but very readily implemented, as will be clear to those skilled in the art), and levers (FIG. 26). For adequate mechanical advantage with a cam, in general it will be desirable to provide a grippable head (as shown in FIGS. 24 and 24a) for a wrench or pliers.

Alternatively a cam may be driven by an Allen wrench, or a cam may be provided with a through-hole for insertion of a torque bar (which may be, for example, a screwdriver shaft). If a lever is used instead of an inclined-plane device (i. e., screw or cam), preferably some means such as an anchored wire loop are provided for locking down the handle end of the lever, after its use to press the leg or legs into place.

Whereas I prefer to use some force-applying means that not only advance but also retain the leg or legs in position, I regard this as an optional matter since provision for retention may be made separately, as for example in the form of a small molded ratchet system.

My invention is not limited to orientations in which the longitudinally extending elements or "legs" are projected downwardly from a seat, platform or the like (as in FIGS. 1 through 14, and 16 through 18). It can instead can be used with the "legs" projecting upward to such a platform or seat—or, of course, sideways horizontally, or indeed at any desired angle.

Correct angling of the beveled surfaces indicated in FIGS. 1e through 1g is important to smooth, firm engagement of the legs with their corresponding pockets. This document is intended to enable a person skilled in the field to practice my invention straightforwardly, or in other words without having to solve difficult geometrical problems.

The person skilled in the field is taken to be a competent furniture maker, cabinetmaker, joiner, or industrial designer. Undue effort would be required to figure out how to determine and actually cut the bevel and tilt angles required.

Therefore as preliminary steps I have mentioned above representative bevel and tilt angles needed for selected leg-inclination angles of 20°, 30°, 35°, 40° and 45°, and I have also set forth simple trigonometric expressions for those same angles. With the aid of a common calculator that does trig functions, bevel and tilt angles can be found in a few seconds for any desired leg inclination.

Those preliminary steps, however, are not the end of the matter. In order to fit snugly into a right-angle vertical corner of the receiving pocket, the bevel surfaces must be at right angles to each other, and this requires that they lie at compound angles to both the horizontal and the vertical planes.

Figure 28:
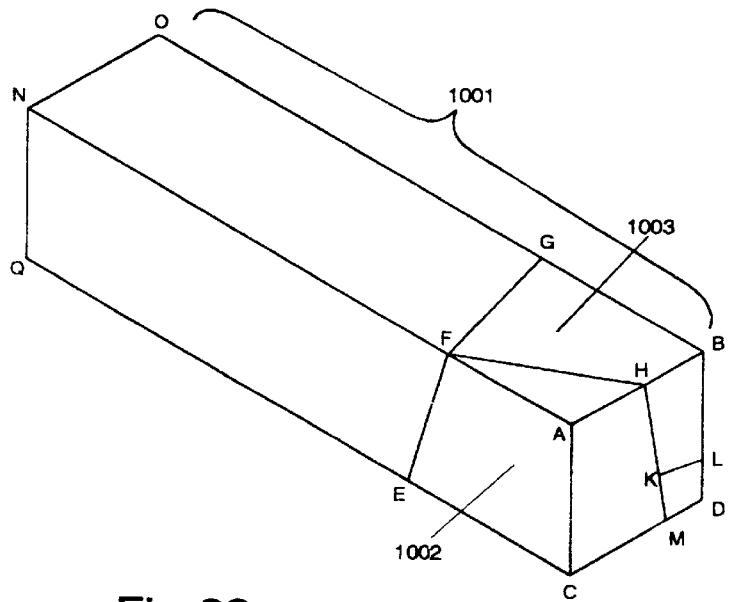
FIG. 28 is an isometric diagram showing in greater detail than FIGS. 1f and 1g how a leg is cut from a length of stock.
Figure 29:
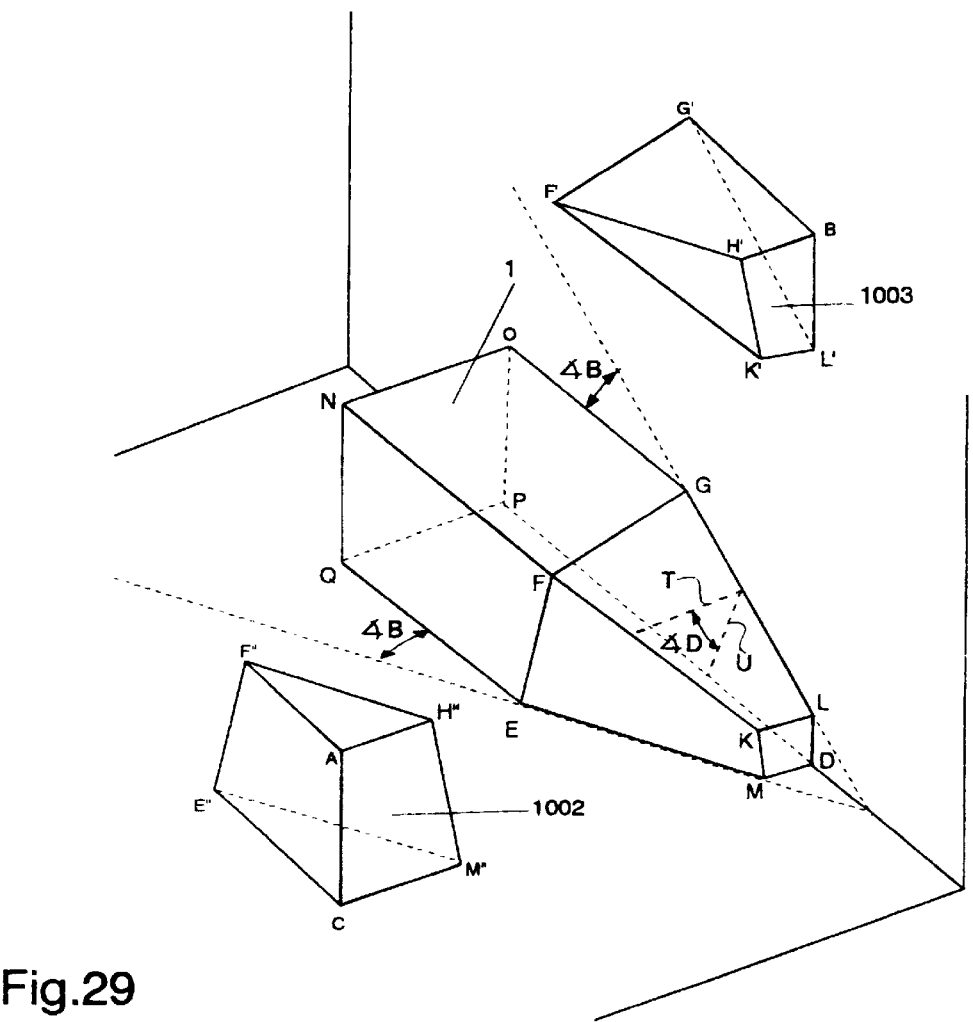
FIG. 29 is a like diagram showing the stock with its offcuts.

This fact may be perhaps best seen in FIGS. 28 and 29. In these drawings, the corner line FG defines the boundary between (1) an original plane NOAB or NOFG of the stock surface and (2) one of the bevel planes FGLK. This boundary line FG is not parallel to the right-angled end corner lines AB, NO of the stock—or, in other words, it is not at right angles to the original long corners OB, OG, or NA, NF.

Similarly, the corner line EF defines the boundary between (3) an original plane NQCA or NQEF of the stock surface and (4) the other bevel plane EFKM. This boundary EF is not parallel to the end corner lines AC, NQ; and not at right angles to the original long corners NA, QC or OE, NF.

More specifically, the point F is shifted toward the original point A, so that the line segment NF is slightly longer than the line segment OG or QE—just far enough to make the angle EFG, in three dimensions, a right angle as seen in the plane perpendicular to the cut-off corner line FK. In other words, the angle EFG appears as a right angle when an observer sights along the cut-off line FK, so that in fact the bevel planes FKLG and FKME are truly at right angles.

Figure 30:
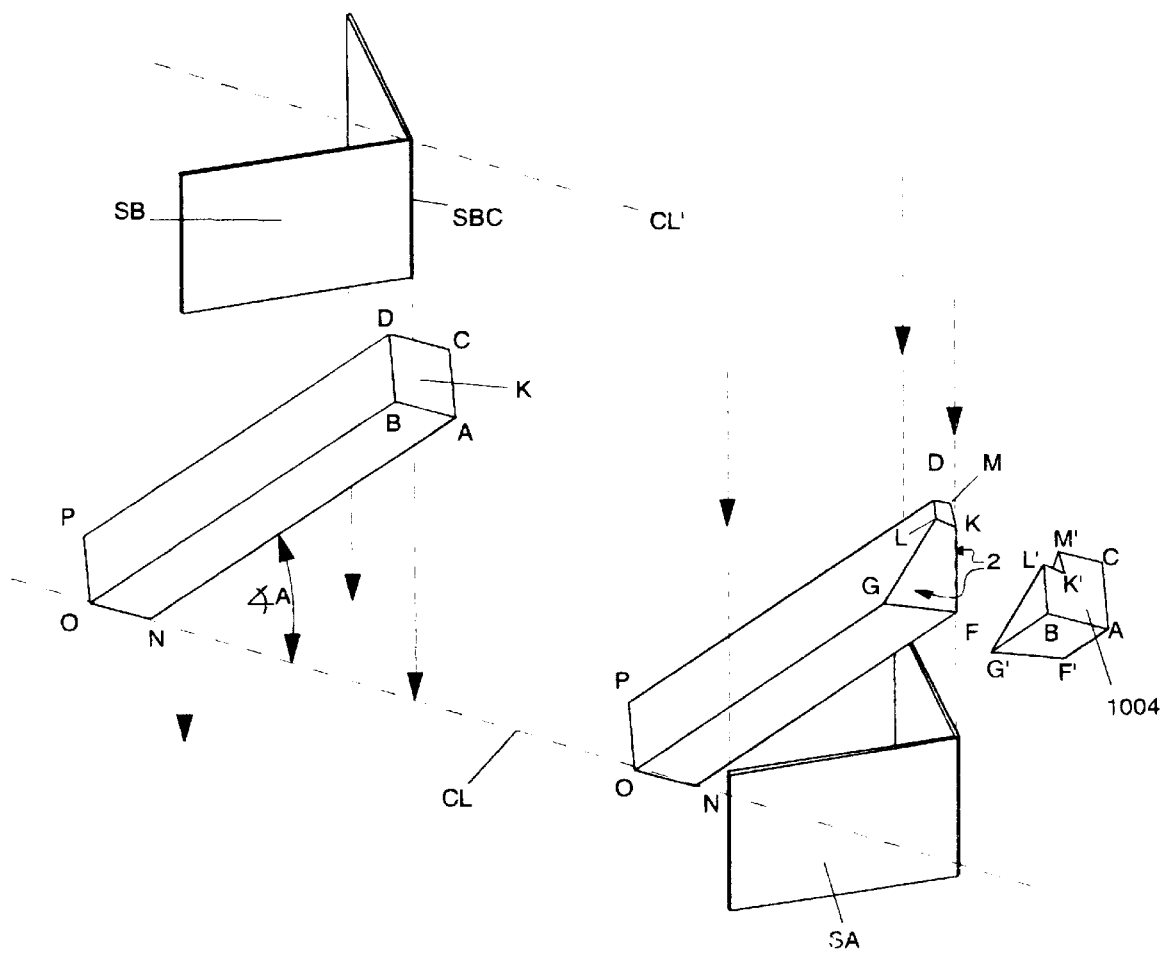

To aid in appreciating how the compound angles of the two bevel planes FKLG, FKEM come about, FIG. 30 shows the original bar of stock 1001 tilted upward by angle ∡A from a horizontal centerline CL that will be the centerline between two vertical constraining surfaces such as 5", 5' (FIG. 1e)—or, to put it more precisely the vertical rear surface 5" and a surface of a mating crossmember 4b which is erected to vertical by the vertical right-hand surface 5'. The bar 1001 is oriented with its top corners PD vertically above its bottom corner NA, so that these two corners and the central axis of the bar are in a common vertical plane with the centerline CL.

In the left-hand view, poised above the stock 1001 is a 90°-angle shear SB before shearing off the stock. This shear SB may be regarded as a hypothetical device to aid in conceptually grasping how the bevel surfaces are formed in the leg tip; however, for high-volume production the shear SB may actually be implemented as a two-sided milling machine.

The corner SBC of the shear is bisected by a centerline CL' which is above and parallel to the centerline CL just mentioned. The 90° corner SBC of the shear is vertical, and is aligned above a point K (also see FIGS. 28, 29) in the square end of the bar 1001.

In the right-hand view is the same shear SA after removing a single offcut piece 1004, which has all of the material of the two offcuts 1002, 1003 of FIGS. 1f, 1g. Since the two cutting surfaces of the shear are at right angles to each other, of course the two bevel surfaces 2 are also at right angles to each other. (One of these surfaces 2 is out of sight around to the right behind the vertical cut corner KF.)

With respect to everything else in the drawing, however, the two bevel surfaces 2 are at quite irregular angles. The primary bevel angles ∡B in the horizontal and vertical planes are shown in FIGS. 1f, 1g and 29.

The secondary tilt or canting angles are not as readily seen, but can be appreciated from the following construction. In FIG. 29 two lines T, U are shown intersecting along the cutoff line LG. The upper line T is in the plane of the bevel surface FGLK, the lower line U is in the plane of the original (but cut-down) surface OPDLG, and the two lines T, U define a common plane that is perpendicular to the corner LG.

In other words, these two lines T and U define a plane which is seen square-on by an observer sighting along the corner LG. Now the angle ∡D in three dimensions between lines T and U is related to the canting or tilt angle B":

$$\angle B'' = \angle D - 90°.$$

Actually the tilt angle ∡B" can be seen very easily in conjunction with presentation of another mode of manufacture, which is in fact much better suited to manufacture of legs 1 for my invention in lower production volume. In fact this manufacturing mode removes offcut pieces 1002, 1003 just as shown in FIGS. 1f, 1g.

This mode of manufacture uses an ordinary table saw consisting of a stationary table 1011 (FIGS. 31a through 31f), rotating blade 1012 and jig 1013 mounted to slide along a track 1014. The result is rectilinear relative motion 1015, parallel to the plane of the blade, between the jig 1013 and blade 1012.

Set up on the jig 1013 are two long wall guides 1016, 1018 and two associated stops 1017, 1019. The wall guides 1016, 1018 are oriented at the previously mentioned bevel angle ∡B to the track 1014 and sliding motion 1015. The stops 1017, 1019 are positioned along the guides 1016, 1018 respectively, equidistant from the corner where the guides intersect, to set a consistent leg length for two cuts.

The saw blade 1012 (see FIG. 31b) is angled to the vertical, at the previously mentioned tilt angle ∡B". Thus in this fixture setup the significance of that angle is very plain. Often table-saw blade settings are read from a scale which gives the inclination of the blade arbor (axle) to vertical, which is equal to the inclination of the blade itself to horizontal. This scale, in other words, gives a complement, namely 90°- ∡B", to the angle ∡B" for which calculations and representative values have been presented in this document.

Figure 31A:
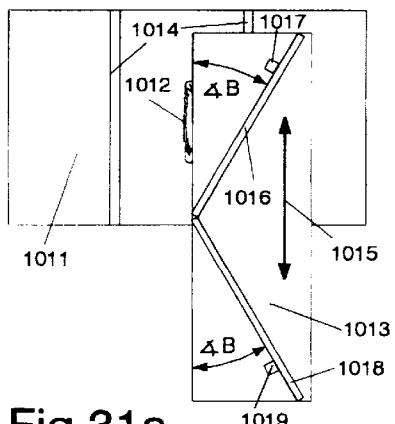
FIG. 31a is a plan view of a table saw fitted with a special mitre board for cutting a leg from stock.
Figure 31C:
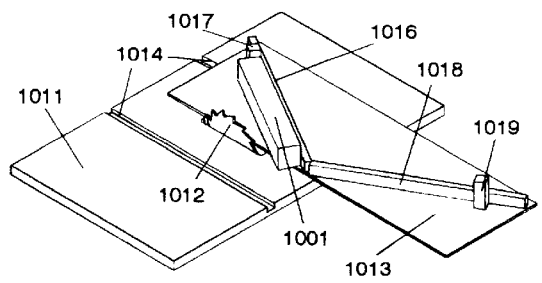
FIG. 31c is a first sequential view showing how a piece of stock is initially set in the same fixture for a first cut.
Figure 31B:
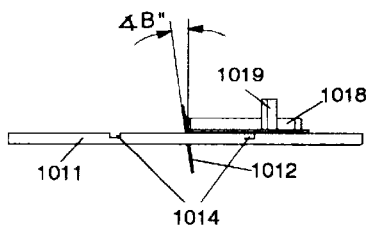
FIG. 31b is an end elevation of the same FIG. 31a saw and fixture.
Figure 31D:
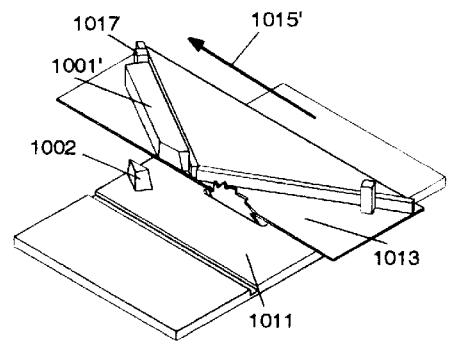
FIG. 31d is a second sequential view showing how the first cut is made.

FIG. 31c shows the stock bar 1001 in place on the fixture, hard against one guide 1016 and the corresponding stop 1017, ready for a first cut. FIG. 31d shows the situation after that first cut 1015', with offcut piece 1002 removed by the blade and intermediate-stage stock piece 1001' still in its first position on the fixture.

Figure 31E:
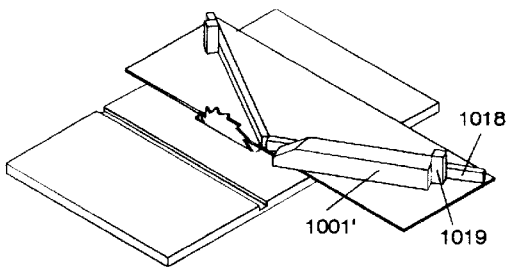
FIG. 31*e* is a third sequential view showing how the stock after the first cut is then set in the same fixture for a second cut.
Figure 31F:
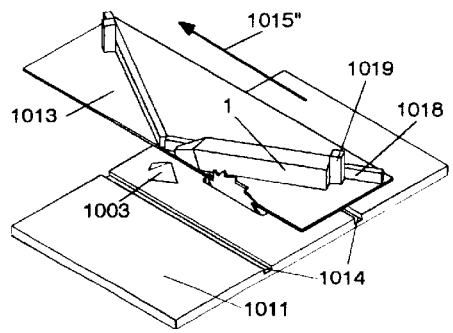
FIG. 31*f* is a fourth sequential view showing how the second cut is made.

FIG. 31e shows the same intermediate piece 1001' picked up and flipped around into position on the second guide 1018 and its corresponding stop 1019, ready for the second cut. FIG. 31f shows the situation after that second cut 1015", with the second offcut piece 1003 removed and final leg 1 remaining on the jig.

Another manufacturing mode that is particularly useful in intermediate production volume, between the previously mentioned milling-machine approach and the table-saw technique just presented, makes use of a cutoff saw. This is similar to a radial-arm saw in having a settable mitre angle, but can be operated vertically for greater convenience.

In this case the blade is set to the bevel angle ∡B, so that the stock can be moved straight across the workbench, for instance from left to right. The stock is held, however, in a cradle that is angled at the tilt angle ∡B".

It will be understood that the foregoing disclosure is intended to be merely exemplary, and not to limit the scope of the invention—which is to be determined by reference to the appended claims.

What is claimed is:

1. A structural system in which at least two members are secured together, said system comprising:
   an elongated structural member having an axis extending generally between first and second ends, and having an unthreaded tip at the first end that extends generally along the axis of the elongated structural member;
   a transversely extended structural member defining guide surfaces for receiving the tip of the elongated structural member; and
   means for applying protracted force to the elongated structural member so that the tip is advanced into the receiving member in a wedging, nonthreading relationship with the guide surfaces.

2. The system of claim 1, wherein:
   the force-applying means comprise means for retaining the tip wedged into the receiving member.

3. The system of claim 1, wherein:
   the forcing means comprise means for longitudinally pulling the tip progressively more tightly into the receiving member.

4. The system of claim 3, wherein:
   the forcing means comprise discrete screw means distinct from the tip and generally aligned longitudinally with the tip.

5. The system of claim 3, wherein the said forcing means comprise:
   traction means defined in one of the members; and
   a discrete screw, distinct from both members, threaded to the other of the members and engaged with the traction means.

6. The system of claim 5, wherein:
   the screw is threaded to the receiving member and carries a force-transmitting surface; and
   the traction means comprise a notch or seat defined in the elongated member and engaged by the force-transmitting surface of the screw.

7. The system of claim 1, wherein:
   the receiving member comprises at least two interfitted crossed beams that are shaped and that cooperate to define said guide surfaces.

8. The system of claim 1, wherein:
   the receiving member defines plural guide-surface regions;
   the system further comprises at least one additional elongated member, each of the elongated members having a respective tip that is wedgingly received in one of the plural guide-surface regions respectively; and
   the forcing means are substantially unitary and act upon all the elongated members in common.

9. The system of claim 1, wherein:
   the guide surfaces are tapered; and
   the tip is tapered.

10. The system of claim 1, wherein:
    the guide surfaces have a longitudinal axis; and
    the elongated member has a longitudinal axis oriented at an angle to the guide-surface axis.

11. The system of claim 1, wherein:
    the guide surfaces have a longitudinal axis; and
    the elongated member has a longitudinal axis oriented substantially parallel to the guide-surface axis.

12. The system of claim 1, wherein:
    the receiving member and elongated member are parts of a constructional set selected from the group consisting of:
      a set in which the receiving member is a support portion of an article of furniture and the elongated member is a leg of said article of furniture,
      a set in which the receiving member is one support portion of a building frame and the elongated member is another portion of the building frame,
      a set in which the receiving member is a support point of an article of play equipment and the elongated member is a leg of the article of play equipment,
      a set in which the receiving member is a temporary structure such as bleachers, risers, a scaffold or a portable stage for performances, and the elongated member is a leg of the temporary structure,
      a set in which the receiving member is one portion of a crane or boom frame and the elongated member is another portion of the crane or boom frame, and
      a set in which the receiving member is one portion of a framework having plural interlocked layers of framing and the elongated member is another portion of the framework; and
    said system further comprises, respectively, said article of furniture, or said building, or said play equipment or said temporary structure, or crane or boom frame, or framework respectively.

13. A structural system in which at least two members are secured together, said system comprising:
    an elongated structural member having an unthreaded tip at an end of the elongated structural member;
    a transversely extended structural member defining guide surfaces for receiving the tip of the elongated structural member; and
    means for pulling the tip longitudinally into the receiving member without rotating or threading the tip into the guide surfaces.

14. The system of claim 13, wherein:
    the elongated structural member has an axis; and
    the tip is generally aligned with the axis of the elongated member.

15. The system of claim 13, wherein:
    the forcing means comprise discrete screw means distinct from the tip and generally aligned longitudinally with the tip.

16. The system of claim 13, wherein the said forcing means comprise:
    traction means defined in one of the members; and
    a discrete screw, distinct from both members, threaded to the other of the members and engaged with the traction means.

17. The system of claim 16, wherein:
    the screw is threaded to the receiving member and carries a force-transmitting surface; and
    the traction means comprise a notch or seat defined in the elongated member and engaged by the force-transmitting surface of the screw.

18. The system of claim 13, wherein:
    the receiving member comprises at least two interfitted crossed beams that are shaped and that cooperate to define said guide surfaces.

19. The system of claim 13, wherein:
    the receiving member defines plural guide-surface regions;

the system further comprises at least one additional elongated member, each of the elongated members having a respective tip that is wedgingly received in one of the plural guide-surface regions respectively; and the forcing means are substantially unitary and act upon all the elongated members in common.

20. The system of claim 13, wherein:

the guide surfaces are tapered; and the tip is tapered.

21. The system of claim 13, wherein:

the guide surfaces have a longitudinal axis; and the elongated member has a longitudinal axis oriented at an angle to the guide-surface axis.

22. The system of claim 13, wherein:

the guide surfaces have a longitudinal axis; and the elongated member has a longitudinal axis oriented substantially parallel to the guide-surface axis.

23. The system of claim 13, wherein:

the receiving member and elongated member are parts of a constructional set selected from the group consisting of:

a set in which the receiving member is a support portion of an article of furniture and the elongated member is a leg of said article of furniture, a set in which the receiving member is one support portion of a building frame and the elongated member is another portion of the building frame, a set in which the receiving member is a support point of an article of play equipment and the elongated member is a leg of the article of play equipment, a set in which the receiving member is a temporary structure such as bleachers, risers, a scaffold or a portable stage for performances, and the elongated member is a leg of the temporary structure, a set in which the receiving member is one portion of a crane or boom frame and the elongated member is another portion of the crane or boom frame, and a set in which the receiving member is one portion of a framework having plural interlocked layers of framing and the elongated member is another portion of the framework; and said system further comprises, respectively, said article of furniture, or said building, or said play equipment or said temporary structure, or crane or boom frame, or framework, respectively.

24. A structural system in which at least two members are secured together, said system comprising:

an elongated structural member having an unthreaded tip at an end of the elongated structural member;

a transversely extended structural member defining guide surfaces for receiving the tip of the elongated structural member;

traction means defined in one of the members; and a screw threaded to the other of the two members, and distinct from the elongated-member tip, for engaging the traction means to apply force to the elongated structural member so that the tip is forced into the receiving member without threading the tip itself into the guide surfaces.

25. The system of claim 24, wherein:

the elongated structural member has an axis; and the tip is generally aligned with the axis of the elongated member.

26. The system of claim 24, wherein:

the screw carries a force-transmitting surface and is threaded to the receiving member; and the traction means comprise a notch or seat defined in the elongated member and engaged by the force-transmitting surface.

27. The system of claim 24, wherein:

the receiving member comprises at least two interfitted crossed beams that are shaped and that cooperate to define said guide surfaces.

28. The system of claim 24, wherein:

the receiving member defines plural guide-surface regions;

the system further comprises at least one additional elongated member, each of the elongated members having a respective tip that is wedgingly received in one of the plural guide-surface regions respectively; and the forcing means are substantially unitary and act upon all the elongated members in common.

29. The system of claim 24, wherein:

the guide surfaces are tapered; and the tip is tapered.

30. The system of claim 24, wherein:

the guide surfaces have a longitudinal axis; and the elongated member has a longitudinal axis oriented at an angle to the guide-surface axis.

31. The system of claim 24, wherein:

the guide surfaces have a longitudinal axis; and the elongated member has a longitudinal axis oriented substantially parallel to the guide-surface axis.

32. The system of claim 24, wherein:

the receiving member and elongated member are parts of a constructional set selected from the group consisting of:

a set in which the receiving member is a support portion of an article of furniture and the elongated member is a leg of said article of furniture, a set in which the receiving member is one support portion of a building frame and the elongated member is another portion of the building frame, a set in which the receiving member is a support point of an article of play equipment and the elongated member is a leg of the article of play equipment, a set in which the receiving member is a temporary structure such as bleachers, risers, a scaffold or a portable stage for performances, and the elongated member is a leg of the temporary structure, a set in which the receiving member is one portion of a crane or boom frame and the elongated member is another portion of the crane or boom frame, and a set in which the receiving member is one portion of a framework having plural interlocked layers of framing and the elongated member is another portion of the framework; and said system further comprises, respectively, said article of furniture, or said building, or said play equipment or said temporary structure, or crane or boom frame, or framework, respectively.

33. A structural system in which at least two members are secured together, said system comprising:

an elongated member having a tip at an end of the elongated member; and a receiving member comprising at least two interfitted crosspieces shaped and cooperating to define guide surfaces for receiving the tip of the elongated member.

34. The system of claim 33, wherein:

the receiving member defines plural guide-surface regions; and the system further comprises at least one additional elongated member, each of the elongated members having a respective tip that is wedgingly received in one of the plural guide-surface regions respectively.

35. The system of claim 34, further comprising:

means for forcing the tip into the receiving member in a wedging relationship with the guide surfaces and for retaining the tip wedged into the receiving member; and wherein the forcing means are substantially unitary and act upon all the elongated members in common.

36. The system of claim 34, further comprising:

means for forcing the tip into the receiving member in a wedging relationship with the guide surfaces and for retaining the tip wedged into the receiving member; and wherein the forcing means comprise separate means for acting upon each of the elongated members separately.

37. The system of claim 33, wherein:

the guide surfaces are tapered; and the tip is tapered.

38. The system of claim 33, wherein:

the guide surfaces have a longitudinal axis; and the elongated member has a longitudinal axis oriented at an angle to the guide-surface axis.

39. The system of claim 33, wherein:

the guide surfaces have a longitudinal axis; and the elongated member has a longitudinal axis oriented substantially parallel to the guide-surface axis.

40. The system of claim 33, wherein:

the receiving member and elongated member are parts of a constructional set selected from the group consisting of:

a set in which the receiving member is a support portion of an article of furniture and the elongated member is a leg of said article of furniture, a set in which the receiving member is one support portion of a building frame and the elongated member is another portion of the building frame, a set in which the receiving member is a support point of an article of play equipment and the elongated member is a leg of the article of play equipment, a set in which the receiving member is a temporary structure such as bleachers, risers, a scaffold or a portable stage for performances, and the elongated member is a leg of the temporary structure, a set in which the receiving member is one portion of a crane or boom frame and the elongated member is another portion of the crane or boom frame, and a set in which the receiving member is one portion of a framework having plural interlocked layers of framing and the elongated member is another portion of the framework; and said system further comprises, respectively, said article of furniture, or said building, or said play equipment or said temporary structure, or crane or boom frame, or framework, respectively.

41. A substantially stationary structural system in which at least two structural members are secured together for supporting at least a normal adult person or comparably heavy object, said structural system comprising:

a substantially stationary elongated and generally vertical structural leg having:

a segment which has (1) a transverse dimension of at least three centimeters and (2) a longitudinal dimension many times its transverse dimension, and a tip at an end of the leg;

a substantially stationary and generally horizontally extended receiving member, for supporting at least a normal adult person or comparably heavy object, and defining guide surfaces for receiving the tip of the elongated leg; and means for applying protracted force to the leg so that the tip is advanced into the receiving member in a wedging relationship with the guide surfaces, with no necessity of rotating the leg relative to the receiving member.

42. The system of claim 41, wherein:

the force-applying means comprise means for retaining the tip wedged into the guide surfaces.

43. The system of claim 41, wherein:

the forcing means comprise means for threadably pulling the tip into the receiving member.

44. The system of claim 43, wherein the forcing means comprise:

threads formed outside or inside the tip; and a threaded element associated with the receiving member and engaging the threads.

45. A structural system in which at least two members are secured together, said system comprising:

an elongated structural leg having:

a segment which has (1) a transverse dimension of at least two centimeters, and (2) a longitudinal dimension many times said transverse dimension, and a tip which is at an end of the leg and is exclusively noncircular in external cross-section;

a substantially stationary, transversely extended structural member defining guide surfaces for receiving the exclusively noncircular external cross-section of the tip; and means for applying protracted force to the leg so that the exclusively noncircular external cross-section of the tip is advanced into the receiving member in a wedging relationship with the guide surfaces, without rotating the leg or its tip relative to the receiving member.

46. The system of claim 45, wherein the forcing means comprise:

means for retaining the tip wedged into the guide surfaces.

47. The system of claim 45, wherein the forcing means comprise:

threads formed inside the tip; and a threaded element associated with the receiving member and engaging the threads.

48. A structural system in which at least two members are secured together, said system comprising:

an elongated structural member having an axis, and having a tip that is at an end of the elongated structural member and extends generally along the axis of the elongated structural member;

a transversely extended structural member defining guide surfaces for receiving the tip of the elongated structural member; and means for forcing the tip into the receiving member in a wedging relationship with the guide surfaces and for retaining the tip wedged into the receiving member;

the receiving member and elongated member being parts of a constructional set selected from the group consisting of:

a set in which the receiving member is a support portion of an article of furniture and the elongated member is a leg of said article of furniture, a set in which the receiving member is one support portion of a building frame and the elongated member is another portion of the building frame, a set in which the receiving member is a support point of an article of play equipment and the elongated member is a leg of the article of play equipment, a set in which the receiving member is a temporary structure such as bleachers, risers, a scaffold or a portable stage for performances, and the elongated member is a leg of the temporary structure, a set in which the receiving member is one portion of a crane or boom frame and the elongated member is another portion of the crane or boom frame, and a set in which the receiving member is one portion of a framework having plural interlocked layers of framing and the elongated member is another portion of the framework; and said system further comprises, respectively, said article of furniture, or said building, or said play equipment or said temporary structure, or crane or boom frame, or framework, respectively.

49. A structural system in which at least two members are secured together, said system comprising:

an elongated member having an outer surface, and having a transverse notch defined in the outer surface, and having a tip that is at an end of the elongated member and extends generally along an axis of the elongated member;

a transversely extended structural member defining guide surfaces for longitudinally receiving the tip of the elongated member; and a screw engaged with the notch and threaded into the receiving member for pulling the elongated member longitudinally into the receiving member in a wedging, nonthreading relationship with the guide surfaces.

50. The system of claim 49, wherein:

the screw also retains the elongated member in said wedging, nonthreading relationship with the guide surfaces.

51. A structural system in which at least two members are secured together, said system comprising:

an elongated member having an outer surface, and having a transverse notch defined in the outer surface, and having a tip that is at an end of the elongated member and is generally aligned, longitudinally, with an axis of the elongated member;

a transversely extended structural member defining guide surfaces for longitudinally receiving the tip of the elongated member; and a fastener, engaged with both the notch and the receiving member, for retaining the tip wedged into the guide surfaces.

52. A structural system in which at least two members are secured together, said system comprising:

an elongated member having original uncut surfaces and having a tip at an end of the elongated member;

said tip having two beveled planar surfaces which in three dimensions lie at substantially a right angle to each other, and at compound angles to the original uncut surfaces; and a receiving member which defines guide surfaces for receiving the tip of the elongated member.

53. The system of claim 52, wherein:

the compound angles include a tilt angle between about one and ten degrees.

54. A method of securing together at least one elongated structural member that has an unthreaded tip, at an end of the elongated member, and has at least one transversely extended structural member that defines guide surfaces for receiving the tip; said method comprising the steps of:

forming a traction surface in the elongated member;

providing an inclined-plane element such as a screw or cam;

fixing to the transversely extended structural member a mating element for engaging and cooperating with the inclined-plane element;

inserting the tip into the transversely extended structural member for engagement of the tip with the guide surfaces;

engaging the inclined-plane element with the traction surface and the mating element; and operating the inclined-plane element to pull or press the tip into a wedging, nonthreading relationship with the guide surfaces.

* * * * *